United States Patent
Minkin et al.

(10) Patent No.: US 12,499,052 B2
(45) Date of Patent: Dec. 16, 2025

(54) METHOD AND APPARATUS FOR EFFICIENT ACCESS TO MULTIDIMENSIONAL DATA STRUCTURES AND/OR OTHER LARGE DATA BLOCKS

(71) Applicant: NVIDIA Corporation, Santa Clara, CA (US)

(72) Inventors: Alexander L. Minkin, Santa Clara, CA (US); Alan Kaatz, Santa Clara, CA (US); Olivier Giroux, Santa Clara, CA (US); Jack Choquette, Santa Clara, CA (US); Shirish Gadre, Santa Clara, CA (US); Manan Patel, Santa Clara, CA (US); John Tran, Santa Clara, CA (US); Ronny Krashinsky, Santa Clara, CA (US); Jeff Schottmiller, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/691,422

(22) Filed: Mar. 10, 2022

(65) Prior Publication Data
US 2023/0289292 A1    Sep. 14, 2023

(51) Int. Cl.
*G06F 9/54* (2006.01)
*G06F 12/02* (2006.01)
*G06F 12/0875* (2016.01)

(52) U.S. Cl.
CPC .......... *G06F 12/0875* (2013.01); *G06F 9/544* (2013.01); *G06F 12/02* (2013.01); *G06F 2212/251* (2013.01); *G06F 2212/254* (2013.01); *G06F 2212/452* (2013.01); *G06F 2212/62* (2013.01)

(58) Field of Classification Search
CPC .......... G06F 12/0875; G06F 2212/452; G06F 2212/62
See application file for complete search history.

(56) References Cited

U.S. PATENT DOCUMENTS

| | | | |
|---|---|---|---|
| 7,680,988 B1 * | 3/2010 | Nickolls | G06F 12/084 711/149 |
| 8,826,270 B1 * | 9/2014 | Lewis | G06F 9/5016 718/1 |
| 10,789,544 B2 * | 9/2020 | Fiedel | G06F 9/546 |
| 12,141,082 B2 * | 11/2024 | Minkin | G06F 12/0813 |

(Continued)

*Primary Examiner* — Nathan Sadler
(74) *Attorney, Agent, or Firm* — Nixon & Vanderhye, P.C.

(57) ABSTRACT

A parallel processing unit comprises a plurality of processors each being coupled to a memory access hardware circuitry. Each memory access hardware circuitry is configured to receive, from the coupled processor, a memory access request specifying a coordinate of a multidimensional data structure, wherein the memory access hardware circuit is one of a plurality of memory access circuitry each coupled to a respective one of the processors; and, in response to the memory access request, translate the coordinate of the multidimensional data structure into plural memory addresses for the multidimensional data structure and using the plural memory addresses, asynchronously transfer at least a portion of the multidimensional data structure for processing by at least the coupled processor. The memory locations may be in the shared memory of the coupled processor and/or an external memory.

16 Claims, 29 Drawing Sheets

(56) References Cited

U.S. PATENT DOCUMENTS

| | | | |
|---|---|---|---|
| 2002/0133747 A1* | 9/2002 | Ravid | G06F 11/1456 714/20 |
| 2004/0268049 A1* | 12/2004 | Madter | G06F 12/0891 711/119 |
| 2008/0282032 A1* | 11/2008 | Shen | G06F 12/0811 711/117 |
| 2009/0037658 A1* | 2/2009 | Sistla | G06F 12/084 711/119 |
| 2011/0035555 A1* | 2/2011 | Wang | G06F 12/0862 712/225 |
| 2018/0143903 A1* | 5/2018 | Wu | G06F 12/121 |
| 2018/0150222 A1* | 5/2018 | Booss | G06F 3/0673 |
| 2018/0329839 A1* | 11/2018 | Durbhakula | G06F 13/1657 |
| 2023/0090429 A1* | 3/2023 | Qi | G06F 13/1621 711/167 |
| 2023/0288471 A1 | 9/2023 | Duluk | |
| 2023/0289189 A1 | 9/2023 | Bangalore Prabhakar | |
| 2023/0289190 A1 | 9/2023 | Parle | |
| 2023/0289211 A1 | 9/2023 | Hirota | |
| 2023/0289212 A1 | 9/2023 | Duluk | |
| 2023/0289215 A1 | 9/2023 | Palmer | |
| 2023/0289242 A1 | 9/2023 | Guo | |
| 2023/0289304 A1 | 9/2023 | Minkin | |
| 2023/0289398 A1 | 9/2023 | Choquette | |
| 2023/0315655 A1 | 10/2023 | Choquette | |

\* cited by examiner

FIG. 7B

```
anchorGlobalAddr[0] = coord[0] * elementSizeInBytes();
for (i = 1; i < 5; i++){
    anchorGlobalAddr[i] = coord[i] * tensorDescriptor.tensorStride[i-1];
    tensorDescriptor.tensorStride[i-1] *= tensorDescriptor.traversalStride[i];
} sharedAddr = initSharedAdd();

baseGlobalAddr[4] = anchorGlobalAddr[4];
for (c4 = blockStart4; c4 < blockStart4 + tensorDescriptor.boxSize[4]; c4 += tensorDescriptor.traversalStride[4]){
    baseGlobalAddr[3] = baseGlobalAddr[4] + anchorGlobalAddr[3];
    for (c3 = blockStart3; c3 < blockStart3 + tensorDescriptor.boxSize[3]; c3 += tensorDescriptor.traversalStride[3]){
        baseGlobalAddr[2] = baseGlobalAddr[3] + anchorGlobalAddr[2];
        for (c2 = blockStart2; c2 < blockStart2 + tensorDescriptor.boxSize[2]; c2 += tensorDescriptor.traversalStride[2]){
            baseGlobalAddr[1] = baseGlobalAddr[2] + anchorGlobalAddress[1];
            for (c1 = blockStart1; c1 < blockStart1 + tensorDescriptor.boxSize[1]; c1 += tensorDescriptor.traversalStride[1]){
                baseGlobalAddress[0] = baseGlobalAddr[1] + anchorGlobalAddress[0];
                int globalAddr = baseGlobalAddr[0];
                for (c0 = blockStart0; c0 < blockStart0 + tensorDescriptor.boxSize[0]; c0 += tensorDescriptor.traversalStride[0]){
                    processElement(c0, c1, c2, c3, c4, sharedAddr, globalAddr );
                    globalAddr += elementSizeInBytes();
                    sharedAddr += sharedAddrIncrement();
                } // c0
                baseGlobalAddr[1] += tensorDescriptor.tensorStride[0];       // advance global address to next slice
            } // c1
            baseGlobalAddr[2] += tensorDescriptor.tensorStride[1];           // advance global address to next slice
        } // c2
        baseGlobalAddr[3] += tensorDescriptor.tensorStride[2];               // advance global address to next slice
    } // c3
    baseGlobalAddr[4] += tensorDescriptor.tensorStride[3];                   // advance global address to next slice
} // c4
```

```
// define tensor descriptors
tensor activationTensor = tensorDescriptor( activationGlobalAddr, cTensorSize, hTensorSize, nTensorSize,
                                            cBlockSize, hBlockSize, wBlockSize, nTensorSize);
tensor weightTensor = tensorDescriptor( weightGlobalAddr, cTensorSize, sTensorSize, rTensorSize, kTensorSize,
                                        cBlockSize, sBlockSize, rBlockSize, kTensorSize);
tensor outputTensor = tensorDescriptor( outputGlobalAddr, wTensorSize, hTensorSize, nTensorSize, kTensorSize,
                                        wBlockSize, hBlockSize, nBlockSize, kTensorSize);

// iterate through tensor space and compute
for (int h = 0; C < hTensorSize; h += hBlockSize) {                  // iterate through tensor vertically
  for (int w = 0; w < wTensorSize; w += wBlockSize) {                // iterate through tensor horizontally
    for (int c = 0; c < cTensorSize; c += cBlockSize) {              // iterate through tensor channels
      for (int r =-filterHeight/2, R <= filterHeight/2, r++){        // iterate through filter vertically
        for (int s =-filterWidth/2, s <= filterWidth/2, s++){        // iterate through filter horizontally // TMA loads block from activation tensor: global -> shared memory
          tensorBlockLoad( activationTensor, activationSMEMaddr, c, w + s, h + r, n );

// TMA loads block from weight tensor: global -> shared memory
          tensorBlockLoad( weightTensor, weightSMEMaddr, c, s, r, k );

// GMMA math. Write results to shared memory
          computeGEMM( activationSMEMaddr, weightSMEMaddr, outputSMEMaddr );
        }
      }
    }

// TMA stores results to output tensor: shared -> global memory
    tensorBlockStore( outputTensor, outputSMEMaddr, w, h, n, k);
  }
}
```

FIG. 7C

| line_ID & 7 | bank ID | | | | | | | |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

FIG. 9A

|   |   | 128B |   |   |   |   |   |   |   |
|---|---|---|---|---|---|---|---|---|---|
| W | H | C=0-63 | | | | | | | |
| 0 | 0 | 0 | 1 | 2 | 3 | 4 | 5 | 6 | 7 |
| 1 |   | 8 | 9 | 10 | 11 | 12 | 13 | 14 | 15 |
| 2 |   | 16 | 17 | 18 | 19 | 20 | 21 | 22 | 23 |
| 3 |   | 24 | 25 | 26 | 27 | 28 | 29 | 30 | 31 |
| 4 |   | 32 | 33 | 34 | 35 | 36 | 37 | 38 | 39 |
| 5 |   | 40 | 41 | 42 | 43 | 44 | 45 | 46 | 47 |
| 6 |   | 48 | 49 | 50 | 51 | 52 | 53 | 54 | 55 |
| 7 |   | 56 | 57 | 58 | 59 | 60 | 61 | 62 | 63 |
| 8 |   | 64 | 65 | 66 | 67 | 68 | 69 | 70 | 71 |
| 9 |   | 72 | 73 | 74 | 75 | 76 | 77 | 78 | 79 |
| 0 | 1 | 80 | 81 | 82 | 83 | 84 | 85 | 86 | 87 |
| 1 |   | 88 | 89 | 90 | 91 | 92 | 93 | 94 | 95 |
| 2 |   | 96 | 97 | 98 | 99 | 100 | 101 | 102 | 103 |
| 3 |   | 104 | 105 | 106 | 107 | 108 | 109 | 110 | 111 |
| 4 |   | 112 | 113 | 114 | 115 | 116 | 117 | 118 | 119 |
| 5 |   | 120 | 121 | 122 | 123 | 124 | 125 | 126 | 127 |
| 6 |   | 128 | 129 | 130 | 131 | 132 | 133 | 134 | 135 |
| 7 |   | 136 | 137 | 138 | 139 | 140 | 141 | 142 | 143 |
| 8 |   | 144 | 145 | 146 | 147 | 148 | 149 | 150 | 151 |
| 9 |   | 152 | 153 | 154 | 155 | 156 | 157 | 158 | 159 |

FIG. 9C

Example General Processing Cluster

METHOD AND APPARATUS FOR EFFICIENT ACCESS TO MULTIDIMENSIONAL DATA STRUCTURES AND/OR OTHER LARGE DATA BLOCKS

CROSS-REFERENCE TO RELATED APPLICATIONS

This application is related to the following commonly-assigned copending US patent applications, the entire contents of each of which are incorporated by reference:

U.S. application Ser. No. 17/691,276 filed Mar. 10, 2022, titled "Method And Apparatus For Efficient Access To Multidimensional Data Structures And/Or Other Large Data Blocks";

U.S. application Ser. No. 17/691,621 filed Mar. 10, 2022, titled "Cooperative Group Arrays";

U.S. application Ser. No. 17/691,690 filed Mar. 10, 2022, titled "Distributed Shared Memory";

U.S. application Ser. No. 17/691,759 filed Mar. 10, 2022, titled "Virtualizing Hardware Processing Resources in a Processor";

U.S. application Ser. No. 17/691,288 filed Mar. 10, 2022, titled "Programmatically Controlled Data Multicasting Across Multiple Compute Engines";

U.S. application Ser. No. 17/691,296 filed Mar. 10, 2022, titled "Hardware Accelerated Synchronization With Asynchronous Transaction Support";

U.S. application Ser. No. 17/691,303 filed Mar. 10, 2022, titled "Fast Data Synchronization In Processors And Memory";

U.S. application Ser. No. 17/691,406 filed Mar. 10, 2022, titled "Efficient Matrix Multiply and Add with a Group of Warps";

U.S. application Ser. No. 17/691,872 filed Mar. 10, 2022, titled "Techniques for Scalable Load Balancing of Thread Groups in a Processor"; and U.S. application Ser. No. 17/691,808 filed Mar. 10, 2022, titled "Flexible Migration of Executing Software Between Processing Components Without Need For Hardware Reset".

FIELD

This technology generally relates to improving processing efficiency and reducing power consumption of processors. More particularly, the technology herein relates to specialized circuitry for handling memory accesses to blocks of data by a parallel processor.

BACKGROUND

Massively parallel high performance compute processing systems—systems that contain many compute processing cores operating in parallel—can break down complex computations into smaller tasks which can then be concurrently performed in parallel by multiple processing cores. For example, GEMMs (General Matrix Multiplications) are a fundamental building block for many operations in neural networks (for example fully-connected layers, recurrent layers such as RNNs, LSTMs or GRUs, and convolutional layers) and scientific applications. GEMM is generally defined as the operation $C=\alpha AB+\beta C$, with A and B as matrix inputs, $\alpha$ and $\beta$ as scalar inputs, and C as a pre-existing matrix which is overwritten by the output. In many applications, the matrices can be very large (for example, 1024× 1024 elements)—requiring many thousands of individual computations.

To increase efficiency, modern GPUs divide such matrix inputs into tiles and compute the tiles in parallel to increase computation speed. Such parallel processing allows complex computations to be performed in a small fraction of the time than would be required if only one or a few processors were to sequentially compute the same computations. For example, the result of the multiplication of two large matrices can be determined by a set of parallel threads where each element of the result matrix is calculated by a respective thread in the set of parallel threads.

Furthermore, the latest GPUs from NVIDIA and other manufacturers have introduced tensor cores to maximize the speed of tensor multiplies. Such tensor cores accelerate matrix multiply and accumulate operations for machine learning and scientific applications. However, while tensor cores have dramatically increased computation speed, memory access speeds have not kept pace.

Many modern processing systems organize memory in a hierarchy (e.g., Level 1 (L1) cache, Level 2 (L2) cache, Level 3 (L3) cache, global memory, etc.). Such memory hierarchies store data that the processing cores are currently working on closer to those processing cores so that it can be made available to the processing cores at lower latencies. Cache memory closest to the processing cores, e.g., L1 cache, can be partitioned, distributed or otherwise organized so that each processing core or set of processing cores has exclusive access to its own cache, avoiding wait times due to memory contention with other cores. Such cache memory is often supported by hardware circuitry that maintains tags and takes care of automatically writing "dirty" (updated) cache lines back to main memory before the lines are flushed—saving the software programmer from the need to explicitly manage the cache. The L1 cache may often be "on chip" with the processing core(s) it serves. In some systems, a parallel processing core may have access to a non-cached "shared memory" which may also be "on chip" or at least closer than the L2 cache to that parallel processing core. See e.g., U.S. patent applications: application Ser. No. 11/554,552, entitled "Shared Memory For Concurrent Threads in a Multithreaded Processor Core" filed on Oct. 30, 2006. This memory is shared between different processing cores to allow them to synchronize and communicate, as well as to increase data locality and data reuse.

Traditionally, retrieving data from global memory (sometimes also referred to as "main memory" or "external memory") into shared memory requires a multi-step process. The processor initiates the process by performing a memory load instruction from main memory. This memory load instruction retrieves the addressed data from the main memory and stores it into a cache line(s) of a cache memory. In modern GPU architectures, there can be several different levels of cache memory (e.g., L3, L2, L1). Finally, the data is retrieved from the cache memory that is "closest" to the processor (e.g., the L1 cache) and stored into one or more registers of the processor. Such registers may be allocated within a register file (which may be another block of local or "on chip" memory)—with different registers within the register file allocated to different processors or processor cores.

Such a traditional approach for loading data into GPU shared memory can, in the case of large data transfers needed for certain common transactions such as matrix multiplications, consume a large number of registers for an extended and often indeterminate period of time. During this time (which in some cases can last for thousands of cycles due to long latency of main memory or other dependencies), the registers may be tied up and unavailable for use by any other purpose. Such register tie-up may prevent the processors sharing the memory from doing other useful work until the registers are released.

Instructions such as the CUDA LDGSTS (Asynchronous Global to Shared Memcopy) instruction described in U.S. Pat. No. 11,080,051 titled "Techniques for Efficiently Transferring Data To a Processor" issued on Aug. 3, 2021, improve the latency associated with the moving of data from the global memory to the shared memory of streaming multiprocessors (SM) in NVIDIA architectures by bypassing the L1 cache and/or register files and writing the data retrieved from main memory directly into the shared memory. However further improved methods for moving data into and out of shared memory are desired to manage memory access demands more efficiently and with increased overall data processing efficiency while still achieving increased math throughput in areas such as artificial intelligence (AI), deep learning (DL) and other applications that can advantageously utilize parallel execution.

BRIEF DESCRIPTION OF THE DRAWINGS

The following detailed description of exemplary non-limiting illustrative embodiments is to be read in conjunction with the drawings of which:

FIG. 7B illustrates example high level pseudo code of processing by the tensor memory access unit according to some example embodiments.

FIG. 7C illustrates example high level pseudo code showing a streaming multiprocessor using the TMAU to load and to store tensor data for GEMM (General Matrix Multiplications) calculations.

FIGS. 9A-9D (collectively FIG. 9) show examples of data swizzling that can be handled by the tensor memory access unit, according to some example embodiments.

DETAILED DESCRIPTION OF EXAMPLE NON-LIMITING EMBODIMENTS

Figure 1:
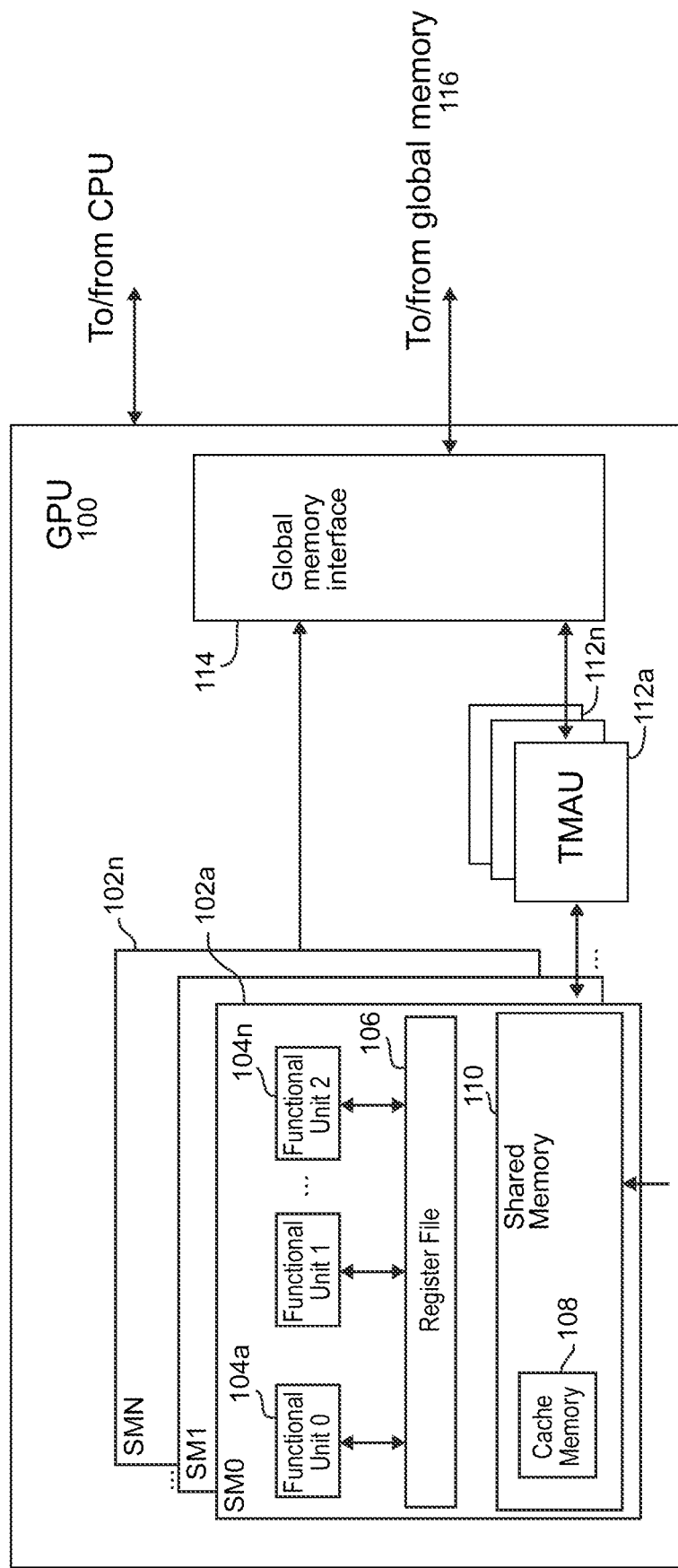
FIG. 1 illustrates a GPU architecture including a parallel processing unit in which each streaming multiprocessor is coupled to a tensor memory access unit ("TMAU") which provides specialized hardware circuitry for memory address calculations and moving multidimensional data structures or data blocks in/out of several types of memories, in accordance with some example embodiments.

The example non-limiting technology described in this disclosure provides streaming multiprocessors (SMs) or other parallel processor cores in a parallel processing system with closely coupled dedicated hardware circuitry for moving data in and out of memories. For example, the disclosed technology provides each parallel processor core to be closely coupled to a tensor memory access unit (TMAU) hardware circuitry for moving large data blocks between the shared memory of the parallel processor core and external memory such as, for example, global memory of the parallel processing system.

Many computational applications require very large (e.g., megabytes or even gigabytes) of data movements between global memory and compute cores of the parallel processor cores such as SMs. Quite often data that is arranged in the global memory as complicated multidimensional structures with non-sequential access patterns has to be transferred to the shared or other memory (SMEM) local to the SM(s) prior to being consumed by the SM(s). For example, when a multiplication of two very large matrices such as those used in DL applications and the like is to be performed by a plurality of threads running on one or more SMs, the data of those two matrices needs to be copied from the global memory to the shared memory of that one or more SMs before the one or more SMs can operate on the data.

Accessing such multidimensional structures in global memory often exacts a significant computation overhead. Reasons for this computation overhead may include sophisticated address calculations, handling of out-of-bounds conditions, resolving SMEM read/write bank conflicts, etc. This type of overhead may negatively impact the performance of a kernel executing on an SM and induce significant software development costs. Such computation overheads are often clearly evident in applications such as DL, for example, in convolutional kernels. A typical convolution kernel accesses multidimensional data structures (matrices that may represent tensors or other information sets) that may be arranged according to different types of standard layouts in global memory. The performance loss related to address calculations in DL kernels may be attributed to register file (RF) bandwidth consumption, extra RF capacity requirements, out-of-bound conditions handling, limited instruction cache capacity, challenges in instructions scheduling, etc. Performance experiments on a variety of DL networks showed average performance losses in excess of 10%. Moreover, in terms of the DL software cost, some developers estimated that up to 90% of developer time is spent on writing and testing data access code. Developer time is consumed in complexities of instruction scheduling, challenges in register allocation, the need to customize kernels for different tile sizes, and the like. Address calculation complexity associated with a kernel can affect both functional correctness and performance optimization of the kernel.

In order to address the outlined issues, example embodiments of this disclosure provide a specialized memory access unit coupled to an SM. With respect to some embodiments in which the specialized memory access unit includes capabilities helpful to tensor or other multidimensional data structure data movement, it may also be referred to as a Tensor Memory Access Unit (TMAU). However, the type of data which the TMAU can move is not limited to tensor data and the target computation core using the data need not be a tensor core but could be any kind of processing core.

A key design goal of the TMAU is to provide the coupled SM(s) with efficient data transfer mechanisms to move large amounts of data between memory locations, such as, for example, a global memory location and a shared memory location. The TMAU enables the SM(s) to be more computationally efficient by offloading a significant portion of the related data access operations from the kernels running on the SM(s) to the TMAU. In contrast to kernels that rely on per thread load/store instructions that operate with relatively small data quanta, the TMAU is configured to accept requests for substantially bigger data blocks or other data structures. By issuing a single request to the TMAU, multiple kilobytes or megabytes of data can be transferred for subsequent use by the SM(s). Also, although the request to the TMAU may be issued by a single thread running on a single SM, the fetched data can be consumed by multiple threads executing on that SM or on multiple SMs.

An apparatus according to the technology described in this disclosure may feed SM core math units at rates faster than techniques that rely on the SM for calculating memory addresses in the data to be copied and to track the progress of copying large blocks of data. Example non-limiting embodiments provide techniques of block data transfer that result in reduced data transfer and memory access overheads. The reduced data transfer and memory access overheads may lead to significantly reduced multi-processor (e.g., SM-level) energy consumption and improved processing efficiency. By way of analogy, consider a line chef responsible for grilling steaks and chops in a restaurant. The line chef can grill and plate the steaks and chops very quickly. But in a busy restaurant, the line chef is generally not also responsible for leaving their station to get meat from the restaurant's big walk-in refrigerator, cutting the meat into portions, trimming fat from the meat, etc. Rather, the line chef relies on their commis (assistant) chefs to do that work. The line chef can then concentrate on what only they can do; grill the steaks and chops to perfection according to the customer's order.

The LDGSTS instruction, which was mentioned above, reduces data access latency by moving data from global memory to shared memory of the SMs and without intermediate writes to L1 cache and/or the register file. However, using that instruction, the movement of large data blocks requires numerous complex address calculations to be performed by the SM before it can issue memory access requests to the memory system. The TMAU, in contrast to the LDGSTS instruction executed by the SM, enables the SM to asynchronously transfer a much larger block of data with a single instruction and to also offload the associated address calculations and the like from the threads on the SM to the TMAU. Moreover, in contrast to each parallel executing thread issuing its own instruction to obtain a small portion (e.g., tile) of the data from the global memory such as is done with the LDGSTS instruction or other conventional load/store instructions, the TMAU enables a single thread in a thread group, such as a cooperative thread array ("CTA") to issue an instruction to obtain the data for access by all the other threads in the group.

The TMAU may be considered similar to a direct memory access (DMA) engine in that the TMAU can handle reads and writes to global memory independently of a requesting processor. A key differentiation is in the TMAU's capability to have knowledge of and traverse multidimensional data layouts whereas DMA typically works with linearly arranged data. Moreover, the TMAU in one example embodiment does not require the requesting processor to include a memory address(es) in the request for memory access. The TMAU can instead generate the appropriate memory address(es) based on a coordinate of a multidimensional structure provided by the requesting processing core.

In one embodiment, each TMAU is closely coupled to an SM, and in some embodiments each TMAU is coupled to a respective SM in a one-to-one relationship. The close coupling to a particular SM may enable the TMAU to more efficiently service memory access requests with less contention than if it had to service requests from multiple processors. Each TMAU, in contrast to DMA engines that receive commands from a driver, receives the memory access requests from the coupled SM. In some embodiments, in contrast to DMA engines which are limited to reading from global memory, the TMAU can copy data from global memory to shared memory, from shared memory to global memory, from global memory source addresses to global memory destination addresses and/or from shared (local) memory source addresses to shared (local) memory destination addresses. In copying within shared memory, a TMAU coupled to a first SM may move data between the shared/local memory of the first SM and a shared/local memory of any other SM in the GPU. For example, the TMAU in one embodiment can copy data from distributed shared memory local to the first SM to distributed shared memory local to another SM.

The TMAU may further include capabilities to detect data reads that are out of bounds of a tensor. In some embodiments, in contrast to techniques by which each thread on an SM loads a quantum of data from global memory, the TMAU can load data for any number or group of threads in the coupled SM. Further, in response to a single request for a data block from the requesting SM, the TMAU is capable of generating multiple requests each for a respective (different) portion of the requested block.

In another embodiment a single TMAU can serve multiple SMs where each SM can send independent requests to the single TMAU. In this embodiment an arbiter, implemented in hardware, may operate to accept requests from multiple SMs and forward the requests serially to the single TMAU. The single TMAU services the requests received from different SMs by transferring data to the local shared memories of the respective requesting SMs.

Parallel Processing System Including TMAU Circuitry

FIG. 1 schematically illustrates a parallel processing unit, for example, a GPU, according to some non-limiting embodiments. As shown in FIG. 1, the GPU 100 includes a plurality of processors. In some embodiments, the plurality of processors comprises multicore processors for example, streaming multiprocessors (SM), 102a ... 102n (collectively 102). Each SM 102 includes a plurality of processing cores such as functional units 104a ... 104m (collectively 104). These functional units 104 can in some embodiments perform a variety of different types of computations, for example floating point 32-bit precision arithmetic, floating point 16-bit precision arithmetic, integer arithmetic of different precisions, etc. In addition, some of these functional units 104 can comprise tensor cores designed to carry a number of GEMMs per clock cycle on N×N matrices, containing floating point values for floating point multiplication and addition. The number of SMs in the GPU and the number of functional units in an SM are not limited. Each functional unit 104 in an SM has access to the register file 106 for that SM, an L1 cache 108, and a shared/local memory 110 for that SM. In some embodiments, as in the embodiment illustrated in FIG. 1, the L1 cache 108 may be a part of the shared/local memory 110. In some other embodiments, the L1 cache and the shared memory 110 may be separate from each other. Furthermore, in some embodiments the shared memory 110 may be part of a distributed shared memory (DSMEM) arrangement that threads executing on other SMs can also access. U.S. application Ser. No. 17/691,690 titled "Distributed Shared Memory", incorporated by reference in its entirety, describes distributed shared memory.

The plurality of SMs 102 may access global memory 116 that is external to the GPU 100 through a global memory interface 114. The global memory 116 may include a hierarchical cache memory (e.g., L2 cache and/or L3 cache) and dynamic random access memory (DRAM). In some examples, the global memory 116 may include a memory management unit (MMU), an X-Bar or hierarchical crossbar interconnect network, a memory partition unit, and/or memory described with reference to FIGS. 10, 11A, and 11B.

Multiple cores, such as functional units 104, in each of the SMs 102 are configured to process a plurality of threads in parallel. A thread (e.g., a thread of execution) is an instantiation of a set of instructions or a kernel configured to be executed by the functional units 104 on a particular data set. Threads of a thread block can be executed concurrently, and multiple thread blocks can be executed concurrently. In some embodiments, single-instruction multiple-data (SIMD) instruction issue techniques are used to support parallel execution of a large number of threads without providing multiple independent instruction units. In other embodiments, single-instruction multiple-thread (SIMT) techniques are used to support parallel execution of a large number of generally synchronized threads, using a common instruction unit configured to issue instructions to a set of cores.

Each of the functional units 104 may connect to a cache memory 108, shared memory 110, and a register file 104 via an interconnect network, for example, a hierarchical crossbar with one or more read and/or write crossbars. The cache memory 108, which may be a L1 cache, and shared memory 110 provide low-latency on-chip memory near the functional units 104 of an SM 102. The register file 106 may include data registers assignable by software to a different functional unit of the plurality of functional units 104 and/or different warps being executed by the SM 102. The register file 106 provides temporary storage for functional units 104 on the SM.

The GPU 100 may support multiple address spaces including local, shared and global to support data visibility for the threads. Additional read only address spaces including constants and textures may be supported. Each thread has its own per thread local or private memory which can be controlled by allocation of registers (see e.g., U.S. Pat. Nos. 8,555,035 and 7,634,621 which are hereby incorporated herein by reference as if expressly set forth).

Each thread in the same thread block or different thread blocks can access the global memory 116 using the hierarchical cache memories. Each thread in the same thread block can access an assigned portion of the shared memory 110, which can be considered per-block shared memory. Each executing block of threads may have an allocated portion of the shared memory 110. The shared memory 110 is a software managed cache used to load data from global memory so that the number of off-chip memory accesses by the executing threads are reduced. The software explicitly allocates and accesses the shared memory 110. Threads in a thread block are synchronized (e.g., after cooperatively loading data from global memory into shared memory) to avoid critical resource use conflicts.

When multiple threads in a thread block are expected to use the same data from global memory 116, shared memory 110 can be used to store this data so that the number of requests to global memory 116 by individual threads for the same data is reduced. Shared memory 110 can also be used to avoid uncoalesced memory accesses by loading and storing data in a coalesced pattern from global memory 116 and then reordering it in shared memory 110 to improve access to the data by the threads.

In some embodiments such as that shown in FIG. 1, where the shared memory 110 includes L1 cache 108, the shared memory may be referred to as a unified memory or unified cache. The unified cache may be provided in the same on-chip memory (e.g., SRAM) used for both L1 cache and shared memory and include a mechanism to allocate how much of the unified memory is dedicated to L1 cache versus shared memory for each kernel call. In some examples, the unified cache may also include a dynamically configurable register file (e.g., register file 106). For more information about unified cache system and how it can be configured, see for example the following references that are incorporated herein by reference as if expressly set forth: U.S. Patent Application Publication No. 2018/0322078; and CUDA C Programming Guide, PG-02829-001_v10.1|May 2019 https://docs.nvidia.com/cuda/cuda-c-programming-guide/index.html #shared-memory.

The plurality of SM 102a-102n can access the global memory 116 through a plurality of TMAUs 112a-112n (collectively 112). Each SM 102 is closely coupled to a respective TMAU 112 which is configured to access global memory 116 via the global memory interface 114. In some embodiments, the close coupling between an SM 102 and a TMAU 112 is one-to-one, and each SM has its own dedicated TMAU 112, but embodiments are not limited thereto. Each TMAU 112 has read/write access to shared memory 110 and L1 cache 108 of the corresponding closely coupled SM 102 by issuing requests to the memory subsystem, and also to the global memory 116. In some embodiments, a TMAU 112 may, in addition to read/write access to the shared memory 110 of its coupled SM, also have read and/or write access to the shared memory on other SMs by issuing requests to the memory subsystem. A distributed shared memory that can be utilized by the TMAU of one SM to access the shared memory on another SM is described in U.S. application Ser. No. 17/691,690 already incorporated by reference. In addition, the TMAU may transfer multidimensional data structures or other data between bulk global memory and linear shared global memory accessible by Cooperative Group Arrays (CGAs) executing on one or plural SMs.

When software running on one or more of the functional units 104 needs data that is stored in the global memory 116, the software initiates a thread with a "load" from memory command. The load from memory command may load data from the global memory 116 and store the data in shared memory 110, making it visible to all threads (e.g., all threads in a thread block). After the data is stored in the shared memory, the threads can access the data multiple times.

Each TMAU 112 enables the circuitry of processing cores in the corresponding SM to continue math and other processing of application program kernels while the address calculations and memory access operations are outsourced to closely coupled circuitry dedicated to address calculations and memory accesses. As described below, a TMAU 112, coupled to an SM 102 and having its own hardware circuitry to calculate memory addresses and to read and write shared memory and global memory, enables the coupled SM 102 to improve overall application program kernel performance by outsourcing to the TMAU accesses to any type of data. In the case of accesses to large multidimensional data structures or blocks of data, which typically consumes hundreds or even more clock cycles, the capability for the SM to outsource such data accesses and to asynchronously proceed with processing provides particularly substantial improvement in performance.

Figure 2:
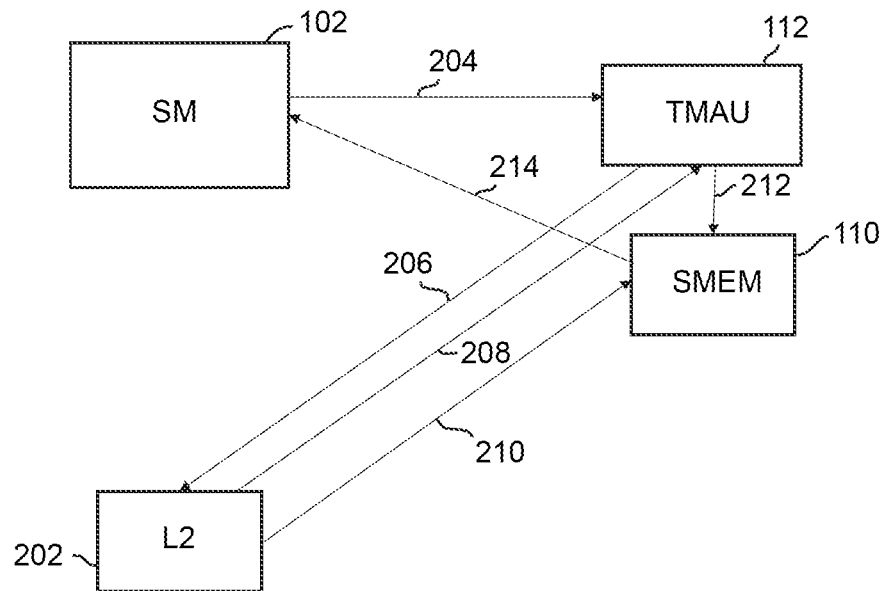
FIG. 2 illustrates interactions between a streaming multiprocessor, tensor memory access unit circuitry coupled to the streaming multiprocessor, external memory, and local shared memory of the streaming multiprocessor when loading a block of data from the external memory to the shared memory, according to some example embodiments.

FIG. 2 illustrates example interactions between an SM 102, a TMAU 112 coupled to the SM 102, a shared memory 110 and a L2 cache 202 of the global memory 116 during a memory access by a thread running on the SM 102, according to some embodiments.

When a thread running on SM 102 needs access to a block of data, the SM determines access parameters for the block of data in the global memory and, at operation 204, commands TMAU 112, by transmission of a single memory access request, to obtain the block of data. The type of access parameters required to be provided from the SM to the TMAU may be different based on, as described in detail below, whether or not the requested block of data is a tensor or not a tensor. As described below in more detail, requests for non-tensor block data may, in addition to the global memory address and the shared memory address for the requested data, include the size of the block to be loaded. Requests for tensor data includes a pointer to a tensor descriptor, a location coordinate associated with the block being requested, and a shared memory address.

In some instances, the request from the SM may request data that is larger in size than that can be requested and/or obtained from the global memory by a single load/store request. For example, the memory subsystem may handle only requests for sizes up to a maximum of one L2 cache line. Thus, in response to the single memory access request received from the SM requesting a large amount of data (a data structure or block larger than the maximum size allowed for a single request to the memory subsystem) of data, TMAU 112 forms and issues multiple memory access requests to obtain the entirety of the requested data. The TMAU 112 operates asynchronously to the requesting SM 102 and proceeds to, at operation 206, generate the multiple memory access requests, each with a respectively different address for a respective subblock in the requested data. The multiple memory access requests are transmitted from the TMAU 112 to the L2 cache 202.

Operation 208 represents the responses from the L2 cache 202 (or global memory) to each of the multiple memory access requests sent by operation 206. The subblocks may be written to the shared memory 110 in operation 210 and/or by the TMAU 112 in operation 212. Operations 212 and 214 may provide for synchronizing the requesting SM 102 and the status of completion of the data request. For example, upon each subblock being written to the shared memory, a counter may be incremented by the TMAU. In some embodiments, each subblock request generated from TMAU includes the counter address in the shared memory, and the updating (incrementing) of the counter may be performed by the shared memory. The SM may monitor the counter to determine when the entire requested block of data has been written to the shared memory. In some embodiments, the request transmitted from the SM includes the address counter address and the SM includes hardware dedicated to monitoring the counter for synchronization.

Between the issuing of the memory access request for the data at operation 206 and the subsequent synchronization with the data written to shared memory at operation 214 many clock cycles may pass. In particular, for requests for large amounts of data, this interval may be several thousands of clock cycles. However, since the SM 102 can request the entire block of data in a single request 204 to the TMAU 112 and thereafter continue with processing instructions while the TMAU 112 asynchronously, and independently of the SM 112, obtains the data by issuing one or more requests to the global memory (e.g., via L2 cache 202), the SM's processing efficiency may be enhanced. By delegating to hardware in the TMAU the numerous address calculations necessary for obtaining a large amount of data of a data structure or block and the associated coordination of the loads and stores of the respective subblocks of the large amount of data, the SM's power consumption may also be reduced.

In contrast to the embodiments of the present disclosure, when the LDGSTS instruction mentioned above is used, the SM, or more particularly the respective threads, calculates the addresses for each subblock to be loaded and issues a respective instruction directly to the global memory (e.g., via L2 202). The SM must then itself synchronize with the shared memory 110 for the respective subblocks. With each thread issuing respective requests for each block of data limited to a maximum size of a request handled by the memory system, a large number of requests may be transmitted to the memory subsystem from the SM. The generation of a large number of requests, and the synchronizing the SM and the shared memory with respect to each block requested by the respective threads impose significant overhead in terms of processing and also in terms of power consumption. In contrast to the manner in which LDGSTS instructions, and other previous techniques, the embodiments disclosed here enables one thread in the group of threads on the SM to request the entire data for all the threads in the group from the TMAU, and to also enables the threads to proceed processing its tasks asynchronously with the TMAU until the requested transfer is completed by the TMAU.

Accessing Tensors

Although TMAU 112 can be used to access any type of a data block arrangement, in some embodiments the TMAU includes capabilities that are specific to tensors. For example, in applications such as deep learning (DL), large amounts of data may be stored in tensors. Tensors can be of any dimension ranging from a one dimensional tensor such as a one dimensional array to an n-dimensional tensor such as a n-dimensional array, where n is a positive number. Although in some embodiments, only tensors of dimensions 1-5 are supported, according to some other embodiments, the size and dimensionality of the tensor is limited only by memory and the TMAU 112 does not impose a limit on the size and/or dimensionality of the tensor that can be requested as a block by the SM.

The TMAU circuitry enables kernel developers to access subblocks within a tensor by using coordinates (e.g., (x, y) in a two-dimensional tensor) which are computationally simpler than memory addresses. The TMAU will convert the coordinate to one or more corresponding memory addresses before issuing the request to external memory.

Figure 3A:
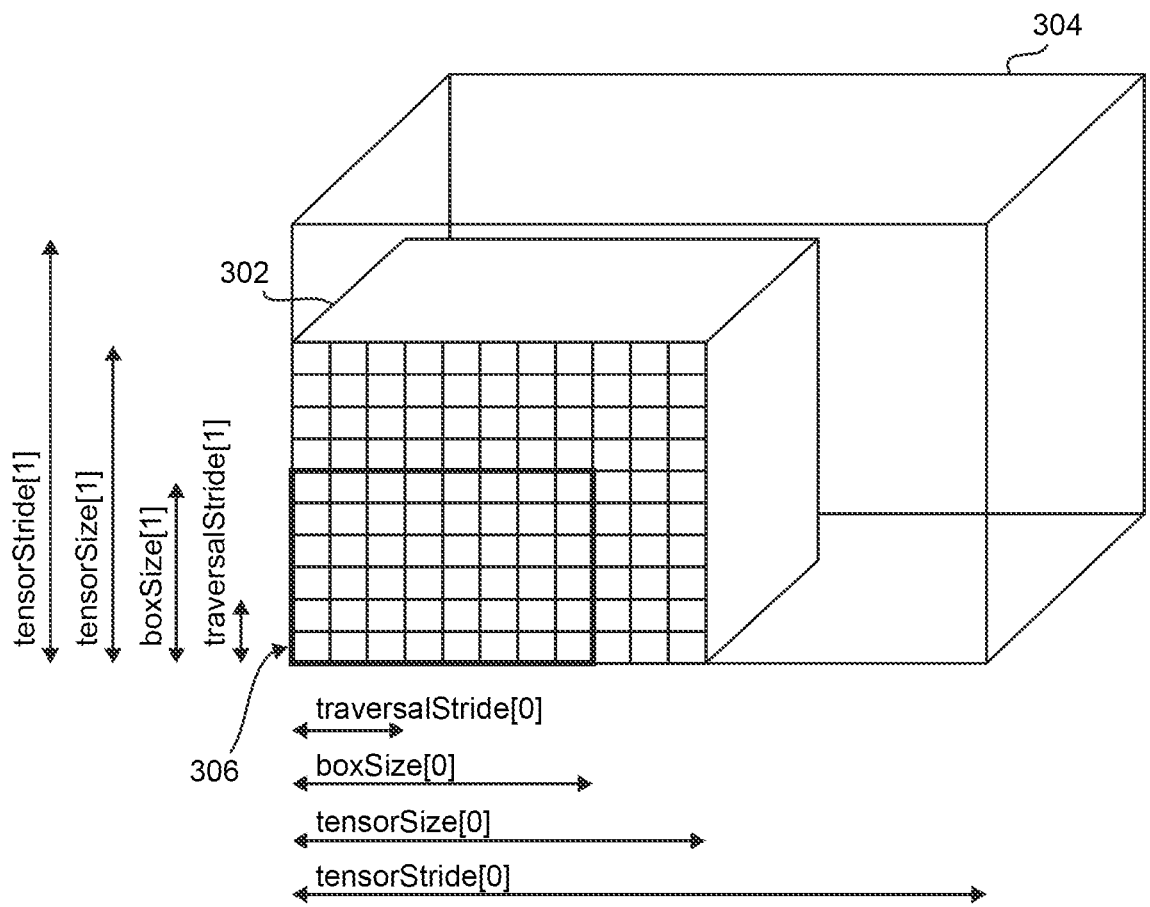
FIGS. 3A and 3B (collectively FIG. 3) illustrate tensor parameters that are applicable to the addressing of tensors that are stored in external memory and that are accessed by the tensor memory access unit according to some example embodiments.
Figure 3B:
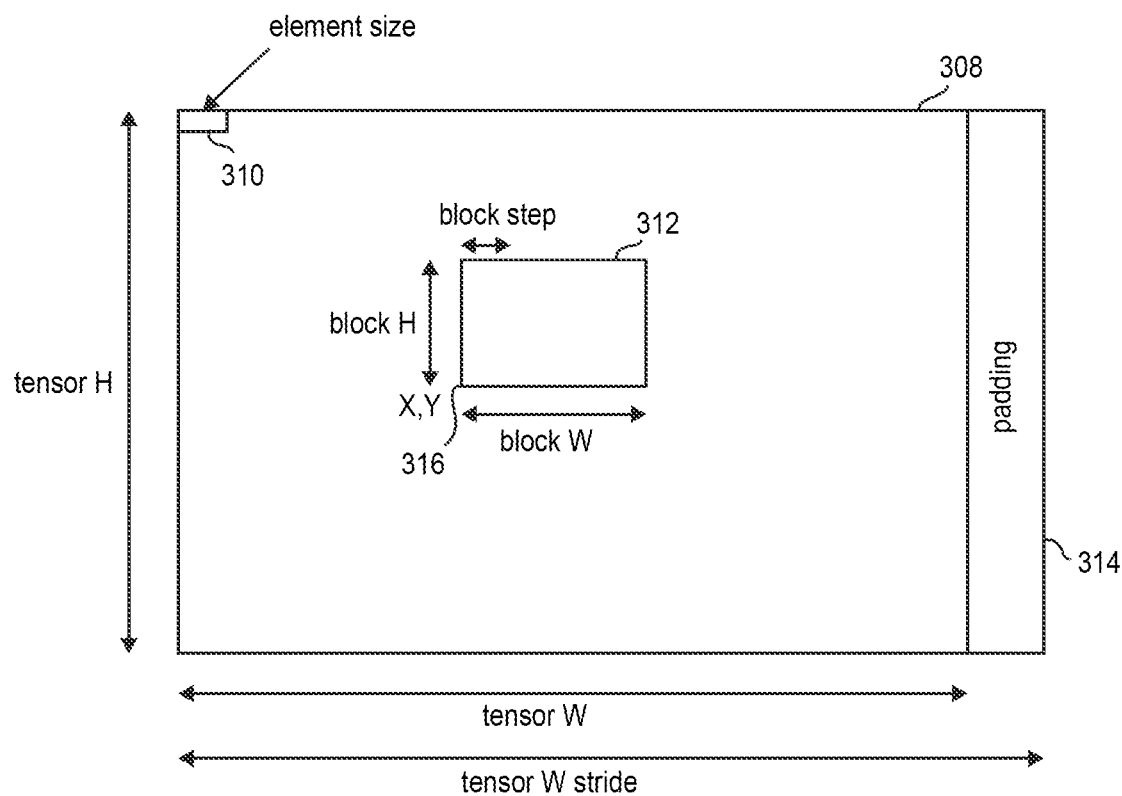

FIGS. 3A-3B (collectively FIG. 3) illustrate parameters that can be used by the SM for accessing tensor data. FIG. 3A illustrates a three-dimensional tensor 302 stored in global memory. The tensor 302 may be written to the global memory by a process executing on a CPU, GPU or other processor in a computer system. Some embodiments of this disclosure provide for threads executing on one or more SMs of a GPU to read from and/or write to the tensor 302 in global memory.

The tensor 302 is accessed by the SM in blocks of a size smaller than the entire tensor, such as, for example, the box 306. The tensor parameters shown in FIG. 3A include the number of dimensions of the tensor, size of each dimension, stride for each dimension, and element size in the tensor. The block to be accessed within the tensor is characterized by the size of each dimension of the block. The number of dimensions of the block is the same as the number of dimensions of the tensor. The tensor may have padding along some dimensions as illustrated with the area above and to the right of tensor 302 within padded tensor 304. The padding could be indicated through tensor strides in the tensor definition, where the stride of the tensor in a particular dimension is defined as the size of the tensor in the particular dimension plus the size of the padding in that dimension. Note that the same tensor could be accessed with blocks of different sizes. In embodiments, for each tensor, all required parameters are defined in a "tensor descriptor" that combines both tensor and access block properties. Before memory access requests to the TMAU are issued, the required parameters have to be defined in the descriptor.

The tensor descriptor is a data structure that is defined in global memory and which can be uniquely identified by its address in global memory. It may be defined either on the host side prior to kernel execution, or on the GPU while the kernel is running. The typical tensor access pattern assumes that multiple blocks are loaded from the same tensor. Loading the tensor descriptor from global memory for each new TMAU request for a block would be inefficient because global memory latency would negatively impact performance. Therefore, in some embodiments, the TMAU has a dedicated descriptor cache (see FIG. 6) in order to take advantage of the temporal tensor access coherency in many kernels that are run on SMs.

FIG. 3B illustrates a two-dimensional padded tensor 308. The figure illustrates an "element" 310 in the tensor, a block 312 within the tensor, and padding 314 in relation to the illustrated dimension. The tensor height H and width W are defined, and also the element size 310. The tensor 308 is padded with padding 314 in the x-direction. Thus, the tensor stride in the x-direction includes the width of the padding. The block 312 is data that is required by a kernel, and also has its own height (block height) and width (block width). The SM may access the block 312 by merely providing the origin point 316 for the block by its coordinates in the tensor's coordinate system—the coordinate pair x, y.

Figure 4A:
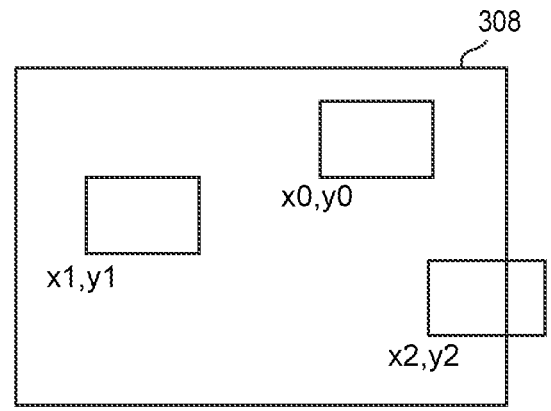
FIGS. 4A and 4B (collectively FIG. 4) show aspects such as out-of-bounds conditions that may be detected by the tensor memory access unit when reading tensor data from external memory, according to some example embodiments.
Figure 4B:
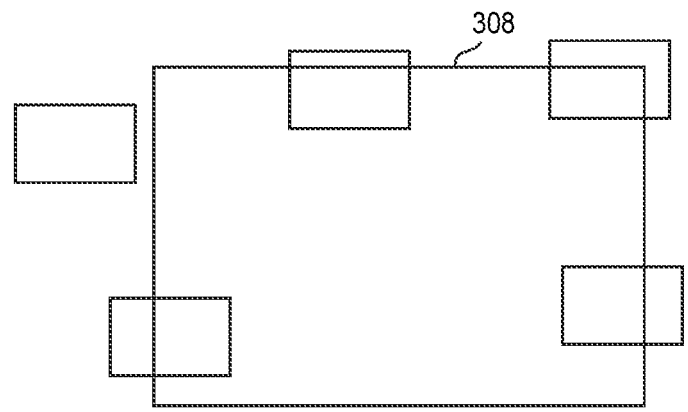

FIGS. 4A-4B (collectively FIG. 4) illustrate some aspects of processing that are handled by the TMAU when accessing a tensor in external memory. FIG. 4A illustrates that a block to be read from tensor 308, a two-dimensional tensor in this example, can be located at many different locations in which the anchor for the block is within the tensor. As shown, some of the anchor locations may result in the box encompassing a memory area that is out of bounds for the tensor 308.

FIG. 4B illustrates that the out of bounds condition can occur in many areas of the tensor 308. For example, the figure illustrates respective box positions in which the left side of the box, the right side the block, the top and right side of the block, the top side of the block, or the entirety of the block can be out of bounds of the tensor in external memory.

The TMAU must properly handle out-of-bound conditions where the requested block may cross tensor boundaries in global memory. FIG. 4B illustrates some examples where requested blocks reach outside of the 2D tensor. If any requested element is located outside of the tensor, then it's value may be forced either to zero or some other predefined special constant (e.g., a not-a-number (NAN) value).

The manner in which out-of-bound access is handled depends on the specific application. In the simplest case zero is assigned to the elements located outside of the tensor. The typical example is a convolution filter applied to the pixels near an image boundary where some of the filter locations may be outside of the image.

In more complicated applications the out-of-bound elements may need to be filled with dedicated non-zero constant. One example is the fusing of the normalization layer with the following convolution layer in a deep learning neural network. The normalization layer applies bias and scale to each element before it is processed by convolution. The out-of-bound elements must be set to zero for the convolution filtering to work properly; however, as a result of the normalization they are assigned the bias value. In order to handle this case, the TMAU can be programmed to assign and recognize a special not-a-number (NaN) constant to indicate the out-of-bound accesses. The special NaN constant may be written by the TMAU to shared memory locations when the tensor data from global memory is written to shared memory. A kernel may be required to check each element from global memory for being equal to this special constant. If the special constant is detected, then zero is assigned to the element, or otherwise scale and bias is applied. This kind of processing may be relevant to floating-point formats only during the training phase of DL. The special NaN encoding is format specific and is based the tensor descriptor format setting. See. e.g., U.S. patent application Ser. No. 17/497,507 filed on Oct. 8, 2021 and titled "Neural Network Data Replacement", the entire contents of which is herein incorporated by reference.

Figure 5A:
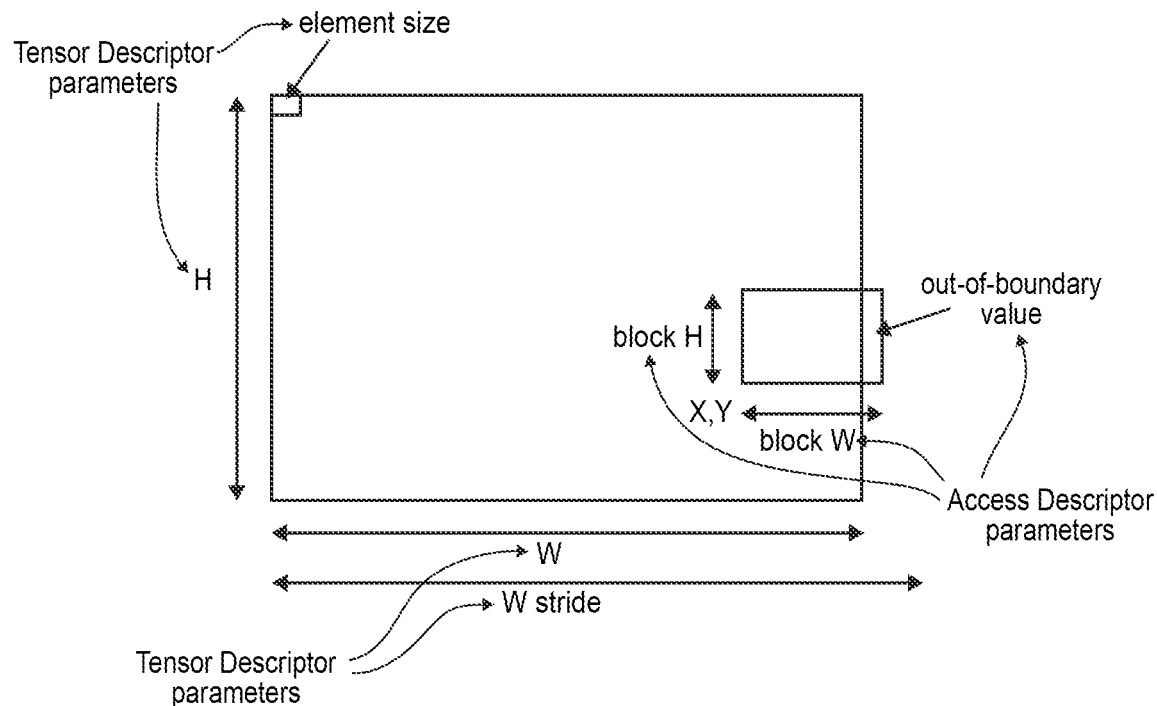
FIGS. 5A and 5B (collectively FIG. 5) show example descriptors used to access data, according to some example embodiments.
Figure 5B:
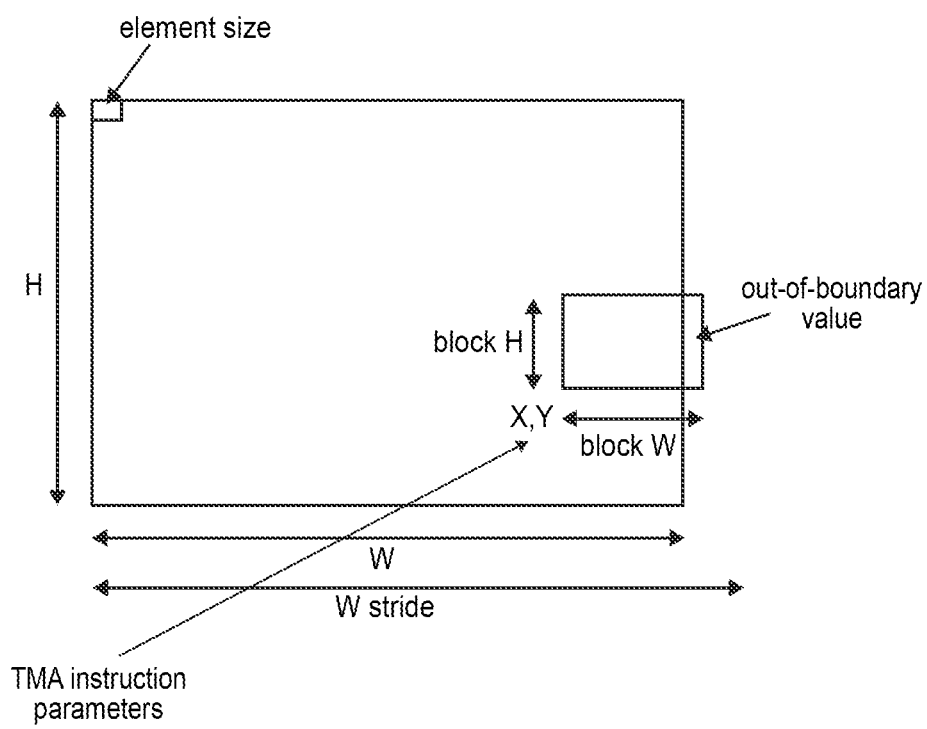

FIGS. 5A-5B (collectively FIG. 5) illustrate, in the context of a two-dimensional tensor and a corresponding block, the groupings of parameters used by the TMAU to efficiently access the tensor in memory. The parameters necessary for the TMAU to uniquely identify a block within a tensor are divided to three groups: a group of "tensor descriptor" parameters that describes the tensor as a whole, a group of "access descriptor" parameters that describes a block within the tensor in general, and a TMAU "instruction parameter" that identifies a particular block. The tensor descriptor parameters and the access descriptor parameters are shown in FIG. 5A, and the TMAU instruction parameters are shown in FIG. 5B.

As illustrated in FIG. 5A, in an embodiment, the tensor descriptor parameters include tensor height, tensor width, tensor stride, and the element size. The tensor stride represents the tensor size (height or width) plus the padding in a particular dimension. The access descriptor parameters include the block height, block width, and the out-of-boundary value. The tensor height, tensor width, tensor stride, block height and block width are specified per dimension of the tensor. As shown in FIG. 5B, the TMAU instruction parameters include just the starting coordinate of the block (e.g., (x, y)). The starting coordinate for an n-dimensional vector accordingly will be an n-dimensional tuple.

TMAU Processing Path

Figure 6:
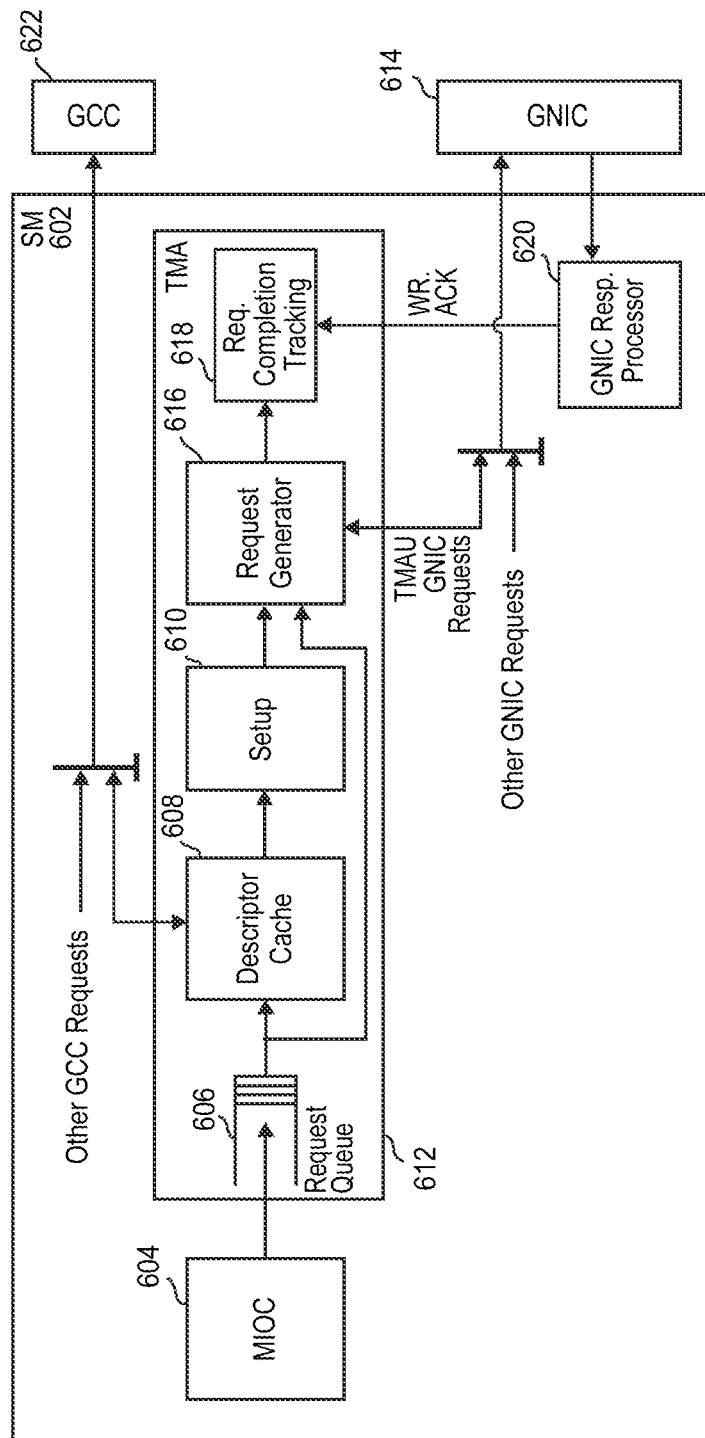
FIG. 6 is a schematic depiction of a memory access request processing pipeline in the tensor memory access unit according to some example embodiments.

FIG. 6 schematically illustrates an example data processing path of a TMAU according to some embodiments. In FIG. 6, TMAU 612 is illustrated as being included within SM 602. However, it will be understood that TMAU 612 may, in some embodiments, while not physically located within the SM 602, be closely coupled to SM 602.

A memory input/output controller (MIOC) 604 provides an interface between SM 602 and the request processing pipeline of the TMAU 612. The TMAU 612 receives memory access requests issued by the SM via the MIOC 604. The received memory access requests are input to the internal request queue 606. In some embodiments, the requests in the queue 606 are processed in first in first out (FIFO) order. However, in other embodiments, the requests in the queue may be selected for further processing based on one or more characteristics of the request, such as, the request type, the size of the read or write request, requested type of data, memory to be accessed, etc.

Two classes of requests may be received in the request queue 606: tensor (with tensor descriptor), and non-tensor (linear memory, without tensor descriptor). The requests may be of different request types such as, for example, loads, stores, reduction, prefetch, etc. For each request for tensor data, the TMAU expects a pointer to the descriptor that provides necessary information about the tensor to access. Whereas in some embodiments the request queue 606 is a single queue receiving both types of requests, in other embodiments respective queues may service each type of request. In some embodiments, the TMAU may only process requests for tensor data, and in some other embodiments may only process requests for only non-tensor block data.

For performance reasons, in some embodiments in which the TMAU is configured to receive memory access requests for tensor data, the TMAU maintains a descriptor cache 608 to hold recently used tensor descriptors. Because general access patterns often involve the same tensor descriptor being accessed by many requests received in time proximity, the descriptor cache may provide for reduced latency. The cache may be tagged by the global addresses of the tensor descriptors. Each received memory access request may specify the global address of the relevant tensor descriptor. The cache is connected to general cache controller (GCC) 622 through an interface. While processing a current request in the internal request queue 606, the TMAU may check whether the descriptor for the next request is resident in the cache 608. If not (i.e. if it is a miss), then a descriptor load request is issued to the GCC in order to prefetch the descriptor from the global memory to cache 608. This parallel processing helps to hide the latency of the descriptor prefetch.

When a request is selected from the queue 606 for processing in the TMAU 602, the selected request is sent to the setup block 610 if the request is for a tensor. When a memory access request is received in the setup block 610, the setup block 610 obtains the corresponding descriptor from the descriptor cache 608. The setup block 610 collects and/or calculates the necessary parameters that are used for the request processing. Although many of the parameters necessary for the memory access is available in (is included in) the descriptor some other parameters are received with the memory access request. For example, the setup unit circuitry may be configured to perform logic similar to that shown in Table 1 below with reference to FIG. 8 in order to populate parameters needed for the address calculation etc. based on the tensor descriptor. It also checks correctness of the request input parameters. As noted above, by providing for parameters that are used by multiple memory access requests to be obtained from the corresponding tensor descriptor and by providing for the memory access request from the SM to only carry parameters that are unique to the particular request, the bandwidth utilization for memory access requests from the SM to the TMAU is optimized. Parameters that are unique to the memory access request such as coordinates or addresses for a block can be carried as immediate parameters with the request. The setup block is configured to perform calculations and error checks on the parameters. An error is generated, and the request is discarded if parameters do not satisfy predefined TMAU requirements. The setup block operates in parallel with the request generator 716, providing a pipeline for setting up generating requests thereby reducing latency.

The request generator 616 is the main TMAU engine. For a request for tensor data, it receives the relevant parameters from the setup block and traverses tensor space by iterating multidimensional coordinates, mapping coordinates to addresses, checking out-of-bound conditions, computing shared memory addresses, computing global memory addresses, and generating requests to the memory subsystem. The request generator generates as many requests to the memory system to load/store the block of tensor data as necessary while adhering to the maximum size of the memory requests handled by the memory subsystem. Typically, the memory subsystems imposes a maximum size of one cache line (e.g., size of one L2 cache line) for each request received at the memory subsystem. The request generator optimizes the requests to improve efficiency of the memory subsystem. The processing by the request generator 616 provides automatic generation of access requests for an entire block by specialized hardware, thereby reducing power use. High level example pseudocode illustrative of the processing within the request generator is shown in FIG. 7B.

The request for data is transmitted via the general network interface controller (GNIC) interface 614 to the memory subsystem, and each request is kept track of in the response completion circuit 618. The tracking enables the asynchronous processing with the SM. Responses to the requests are received at a GNIC response processor 620, which communicates with the request tracking circuitry 618 to keep track of the completion status of each request transmitted from the request generator 716.

If the memory access request received from SM is for block data that is not a tensor, in some embodiments, the request may be sent to the request generator 616 bypassing the descriptor cache 608. In FIG. 6, for example, the requests for non-tensor block data can be routed from the queue 604 to the request generator bypassing the descriptor cache 608 and the setup unit 610. In some embodiments, however, such requests can be directed from the queue 606 to the setup unit 610 before being processed in the request generator 616. The request received from the SM for a large non-tensor block of data may include a global memory address for the block, the shared memory address for the block, and the size of the block in bytes. The request generator 616 may, for a request received from the SM for a large non-tensor block of data, automatically generate a sequence of requests to the memory subsystem with each request being for a smaller sub-block of the requested block. The request generator calculates the global memory addresses for the sub-blocks based on the global memory address for the block as included in the request received from the SM, and the size of the sub-block may be determined in accordance with the maximum size of requests handled by the memory subsystem. The request completion tracking circuitry 618 tracks the memory requests for the sub-blocks and responses received from the memory subsystem in the same manner as described above with respect to tensor data blocks.

Figure 7A:
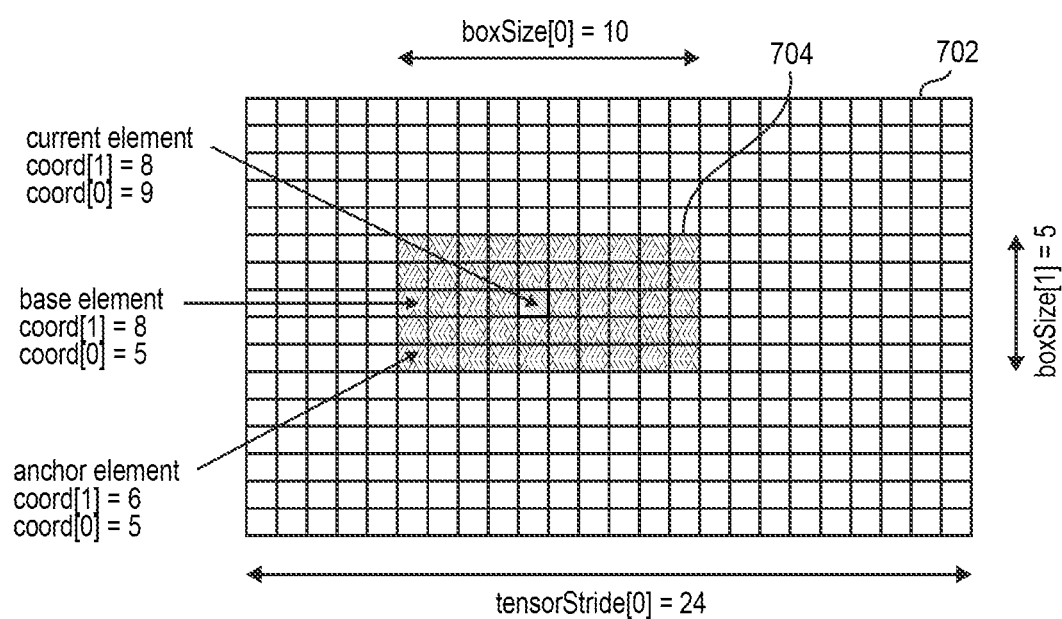
FIG. 7A shows example parameters that affect reading of tensor data by a tensor memory access unit, according to some example embodiments.

FIG. 7A and FIG. 7B illustrate example parameters using which a block 704, shown in FIG. 7A, is kept track of when a tensor data structure 702 is read by the circuitry of the TMAU. FIG. 7A illustrates examples of parameters including anchor, base, and current element that are used in the example high level pseudocode shown in FIG. 7B of a portion of the processing logic implemented in the hardware of the TMAU. FIG. 7C illustrates example high level pseudocode in which the SM invokes tensor load operations in the TMAU to copy data from global memory to shared memory, and subsequently write the result data to the global memory.

The pseudocode in FIG. 7B is a high level example of some of the processing steps performed by the TMAU in response to receiving a request from its coupled SM to obtain a block from a tensor in global memory. The pseudocode is arranged in five nested loops, with each loop corresponding to a respective one of the five coordinate axes of the tensor data space. Although the example is for a tensor data space of five dimensions, some embodiments can support N nested loops for N-dimensional tensor data space where N may be any positive integer.

The current element is processed within the innermost loop by specifying the calculated coordinates in each of the five dimensions (coordinates c0, c1, c2, c3 and c4), the address in shared memory to which the current element is to be loaded, and the current element's global address. After the current element is obtained, the global memory address and the shared memory address for the next element is calculated by incrementing the global address by the element size for the tensor, and incrementing the shared memory address by a predefined shared memory address increment (shared memory address increment may be defined in the tensor descriptor and may be based on the element size defined for the tensor). The processing within the innermost loop includes processing such as checking of out-of-bounds conditions etc. that are performed by the TMAU for copying tensor data.

The innermost loop provides for iterating over elements along dimension 0 (of the dimensions 0-4) by starting from the requested block's coordinate in dimension 0 (blockstart0) and incrementing the current coordinate c0 in dimension 0 by the traversal stride for dimension 0 ("tensorDescriptor.traversalStride[0]") to a dimension 0 coordinate that exceeds the box size in dimension 0 ("blockStart0+tensorDescriptor.boxSize[0]"; block boundary is exceeded).

When the innermost loop (the loop to iterate through tensor elements in dimension 0) is exited, the base global address for the next outer dimension (i.e. dimension 1) is incremented by the tensor stride defined for dimension 0 ("baseGlobalAddr[1]+=tensorDescriptor.tensorStride[0]"). This effectively advances the global address to the next slice. The base global address for each dimension is initially determined based on the global address corresponding to the anchor element of the requested block.

As illustrated in FIG. 7B, in a manner similar to that described above for dimension 0, each loop provides for iterating in a respective dimension for a number of times determined by a starting block coordinate, the traversal stride along that dimension, and the box size for that dimension. It should be noted that the traversal stride and the box size for each dimension is defined in the tensor descriptor for the tensor.

By performing the processing involved in copying data blocks from a tensor in global memory in hardware, the TMAU may significantly reduce the computational load on the SM for data movement thereby increasing the processing efficiency of the SM and also reducing the power consumption of the SM.

The above pseudo-code in FIG. 7B provides high level execution logic and omits details related to certain aspects such as, for example, efficient L2 requests generation, swizzling, and handling out-of-bound conditions that are carried out by the TMAU in reading and/or writing tensors.

In addition to the L2 requests generation (requests to global memory), the TMAU keeps track of the return data in order to report the TMAU transaction completion. The TMAU has to have dedicated counter that keeps track of the issued L2 requests. Every time the request is sent to L2 cache the counter is incremented. When data come back from L2 cache the counter is decremented. Once the counter reaches zero value the whole block is loaded to shared memory and the TMAU can report transaction completion. For efficiency purposes the TMAU may use single counter to track a group of multiple back-to-back transactions and report the completion for the last transaction in the group. In some embodiments, the counter(s) may be maintained in a predefined location in the shared memory. The SM may include a synchronization circuit that monitors the counter (s), and may implement a synchronization barrier or the like based on the counter.

FIG. 7C shows example pseudocode for a convolution filter with implicit GEMM performed by a kernel running on an SM. GEMM, as also noted above, is generally defined as the operation $C=\alpha AB+\beta C$, with A and B as matrix inputs, $\alpha$ and $\beta$ as scalar inputs, and C as a pre-existing matrix which is overwritten by the output. A plain matrix product AB is a GEMM with a equal to one and $\beta$ equal to zero. This type of calculations are required for many DL applications and the like. An example Efficient matrix multiply and add implementation that may utilize the TMAU is described in U.S. application Ser. No. 17/691,406 titled "Efficient Matrix Multiply and Add with a Group of Warps", which is hereby incorporated by reference in its entirety.

The kernel obtains pointers to tensor descriptors for three tensors: an activation tensor, a weight tensor and an output tensor, and size information for each of those tensors. The activation tensor, the weight tensor, and the output tensor may be represented as the matrices A, B and C, respectively, in the GEMM calculation. The kernel provides the TMAU with the pointers to the tensor descriptors for the activation tensor, the weight tensor, and the output tensor when it issues subsequent memory access request (tensorBlockLoad( )) to the TMAU.

The logic is organized as a series of nested loops, so that a sequence of blocks of each tensor is copied by copying a respective block in each iteration of the innermost loop. In each iteration of the innermost loop, the kernel issues a respective tensorBlockLoad request to the coupled TMAU to load a block from each of the activation tensor and the weight tensor. The tensorBlockLoad request takes as arguments the address of the tensor in global memory (as determined the SM) and the address in shared memory to which the tensor data from the global memory is to be written. The nested loops are arranged so that the outer three loops iterate through vertically, horizontally and channel-wise, and the innermost loops iterate through the convolution filter.

The NHWC (N (dimension), Height, Width, Channel) layout is assumed for the activation tensor and the KNWC layout for the weight tensor. The code iterates through W and H dimensions. It accumulates for channels (C dimension) and each r and s location of the convolution filter. For simplicity, iterations through N and K dimensions are not shown. For given [c, s, r] the TMAU loads blocks of data from global memory to shared memory. The loads are done both for activation and weight tensors. After the data for the two matrices is loaded to the shared memory—the SM may call the GEMM calculation (computeGEMM( )). The GEMM calculation, in some embodiments, is performed by a specialized hardware circuit and the result is accumulated into the output matrix. The matrix multiplication is calculated in the shared memory.

After the math is completed using the tensor data loaded in the shared memory, the TMAU is used by the kernel on the SM, by issuing a request (tensorBlockStore( )) and providing the addresses for the output matrix in which the results from the GEMM are stored and the address in shared memory to which the result is to be written, to save the results from the shared memory buffer to the tensor in the global memory.

Support for Tensor Loading Modes

The TMAU supports multiple memory layouts for tensors. For example, three-dimensional image tensors may have the tensor layout format NDHWC in which the innermost dimension C represents the number of channels (e.g. in an image tensor, each channel may represent a color), the D, H, W dimensions correspond to depth, height and width dimensions respectively and the N represents the batch size of the tensor.

In addition to supporting multiple tensor layout formats, the TMAU also supports tensors that are stored in the global memory in non-interleaved mode or in interleaved mode. In interleaved mode, the TMAU may support multiple slice sizes (e.g. 16 byte slices, 32 bytes sizes, etc.). In some embodiments, the tensor descriptor for a tensor may specify whether that tensor is in the non-interleaved mode or the interleaved mode in global memory, and also the size of the slice in interleaved mode.

Moreover, in some embodiments, the TMAU supports more than one tensor loading mode. For example, a tiled mode and an image-to-column (also referred to as "im2col") mode may be supported as tensor data loading modes.

The tiled mode is preferred in some instances for reasons such as data replication not being required in the implicit general matrix multiply (GEMMs) implementation and therefore providing substantial memory bandwidth savings. On the other hand, in some cases, performance may be lost because of tile-quantization effects. The tiled mode is a general TMAU load mode that could be used in a wide range of different DL and high performance computing (HPC) applications. An example of tensor traversal for the tiled mode is described above in relation to FIG. 7A and FIG. 7B.

The im2col mode is primarily used in convolution kernels based on implicit GEMM. If im2col mode is selected, then TMAU does image-to-column transformation when it loads tensor blocks from global memory. This adds extra complexity to the tensor traversal algorithm.

In the tiled mode, the tensor parameter boxSize[ ] uniquely defines boundingBox size in the tensor space that holds all the elements that the TMAU is supposed to load in response to an instruction from the SM. Each element of the boxSize[ ] specifies boundingBox size along a corresponding dimension: boundingBox[i]=boxSize[i]. The coordinates specified in a TMAU memory access request from the SM uniquely define the location of the boundingBox in the tensor space.

In the im2col mode, the boundingBox size and location are defined differently. The number of boundingBox dimensions is one less than the tensor dimensionality in the tensor descriptor. The boxSize[ ] is not used in this mode, and instead there are alternative parameters in the tensor descriptor to support the im2col mode. The alternative parameters include the following: rangeNDHW, rangeC, boxBaseCornerDHW, boxFarCornerDHW. The boxBaseCornerDHW and boxFarCornerDHW define boundingBox size and location in DHW (Depth, Height, Width) space. The boxBaseCornerDHW specifies initial coordinates of the boundingBox origin which is box upper left corner. The boxFarCornerDHW specifies initial location of the opposite right bottom corner. The corners' locations are defined as signed offsets from the corresponding tensor corners. Therefore, the bounding box corners could be specified both inside and outside of the tensor boundaries.

The locations of the bounding box corners are affected by convolution filter size and the selected dilation factor. The corner coordinates may be calculated as the half of the filter size multiplied by the dilation factor. The precision for the bounding box corners is chosen to provide wide range of the convolution kernel sizes and dilation factors. Based on real application analysis, higher precision may be desirable for the tensors with the smaller dimensionality. For example, a speech processing application which uses 3D tensors may require dilation factor of up to 8K, while image processing applications that use 4D or 5D tensors need much smaller dilation factors of up to 128.

The boxBaseCornerDHW and boxFarCornerDHW define boundingBox sizes using the following formulas: boundingBox{D,H,W}=tensorSize{D,H,W}−boxBaseCorner{D,H,W}+boxFarCorner{D,H,W}). For the C dimension, the size is defined by the rangeC parameter.

Figure 8A:
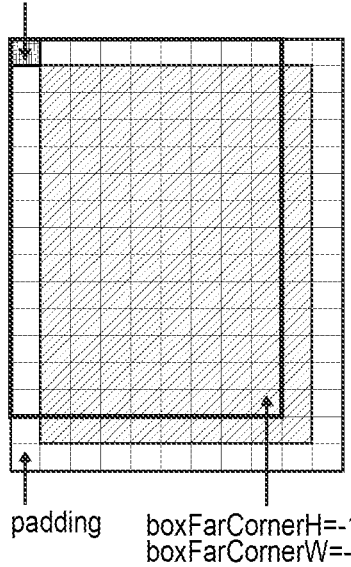
FIGS. 8A-8K (collectively FIG. 8) show the use of example data loading modes, specifically the tile mode and the image-to-column mode, according to some example embodiments.
Figure 8A:
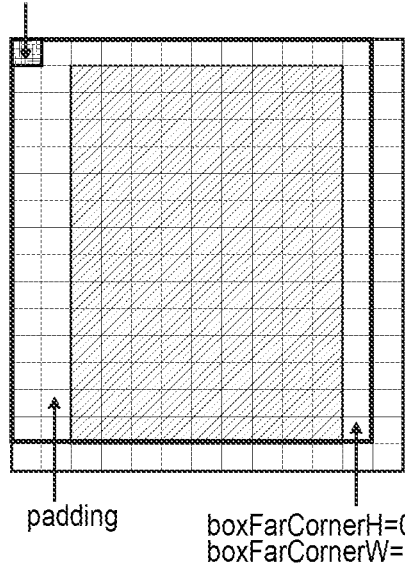
Figure 8A:
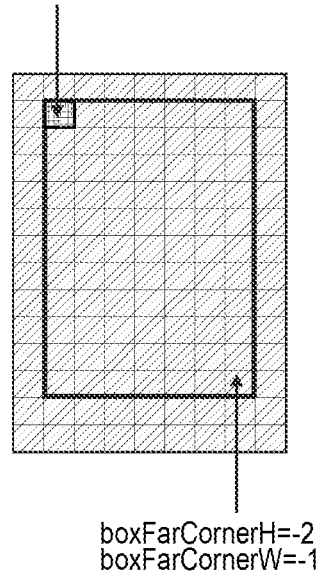
Figure 8A:
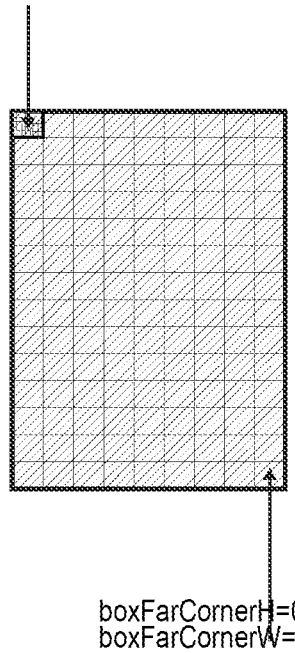
Figure 8A:
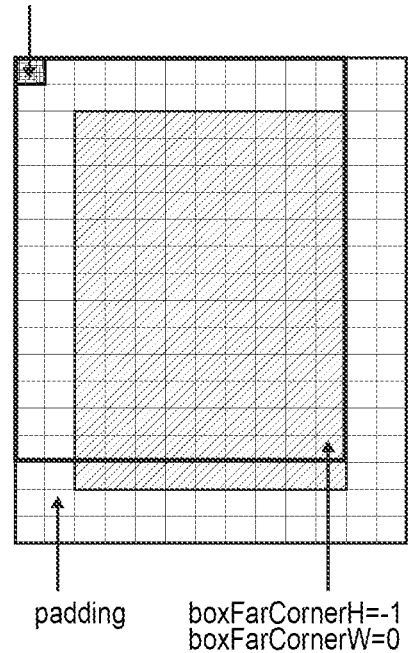
Figure 8A:
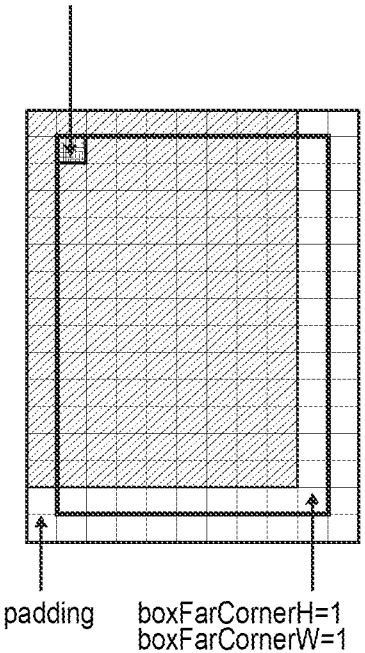

FIG. 8A illustrates how boundingBox depends on the boxBaseCorner{D,H,W}, boxFarCorner{D,H,W} settings. This example shows that many types of borders may be used in the data structures, and in the im2col mode, quantization can be avoided.

In the tiled mode, the number of elements to load depends on the boxSize[ ] parameters. When the TMAU traverses a particular dimension, it uses the corresponding value from the boxSize[ ] to determine how many elements to load. In the im2col mode rangeNDHW is used to determine how many elements to load along NDHW dimensions and rangeC for the dimension C. A single TMAU request may require the TMAU to traverse multiple images from a batch (N dimension) in order to load a requested number of elements. When TMAU switches from the current image to next during traversal of multiple images, it may skip channels that are outside the range defined by rangeC parameter.

In the tiled mode, the TMAU request coordinates specify boundingBox location (origin) in the tensor space. In im2col mode, coordinates along C and N dimensions are used similar to the tiled mode; however, coordinates along W, H, D dimensions specify the base location of the convolution filter (upper left corner) in the tensor space. For correct processing, the TMAU requires that the base location of the filter is always be defined within the boundingBox. In addition, coordinate offsets for these dimensions have to be specified in the TMAU request. The offsets allows the position of the block to be specified relative to the tensor, and therefore using only a minimal number of bytes. The offsets are added to the filter base location coordinates to determine starting locations in the tensor space from where the load operation must be initiated. The same offsets are used to position boundingBox relative to the initial coordinates specified in boxBaseCornerDHW. The offsets are applied to subset of the coordinates based on the table defined above. The offsets are defined as unsigned integer with variable precision. The precision depends on the tensor dimensionality and chosen based on the earlier justification for the bounding box coordinates precision.

In some embodiments, all offsets are packed in 16 bits within a single register. The number of offsets depends on the tensor dimensionality; therefore, the precision may vary accordingly. In the typical convolution kernel once the filter base is calculated it could be reused for multiple TMAU requests with different coordinate offsets. The number of reuses depends on the convolution filter size. For example, for a 3×3 filter, nine requests are issued for the same filter base location.

For the interleaved layouts, the C coordinate must be specified in terms of channel slices rather than individual channels. This applies to both tiled and im2col modes.

Table 1 below shows example pseudocode at a high level for logic implemented in the TMAU, more particularly, in the setup block, to configure the tensor and access parameters based on the tensor descriptor identified in a received TMAU request

TABLE 1 example pseudocode for initializing a load-tensor (dimensions 3D-5D)

```
if (tensorDescriptor.interleaving = = disable){
    boundingBox[0] = rangeC;
    switch(tensorDescriptor.dimensionality){
        case 5: boundingBox[3] = tensorSize[3] – boxBaseCornerD +
        boxFarCornerD;
        case 4: boundingBox[2] = tensorSize[2] – boxBaseCornerH +
        boxFarCornerH;
        case 3: boundingBox[1] = tensorSize[1] – boxBaseCornerW +
        boxFarCornerW;
    }
}else{
    switch(tensorDescriptor.dimensionality){
        case 5: boundingBox[2] = tensorSize[2] – boxBaseCornerD +
        boxFarCornerD;
        case 4: boundingBox[1] = tensorSize[1] – boxBaseCornerH +
        boxFarCornerH;
        case 3: boundingBox[0] = tensorSize[0] – boxBaseCornerW +
        boxFarCornerW;
    }
    boundingBox[dimensionality - 2] = rangeC;
}
```

The following examples illustrate use of im2col mode. A 3×3 convolution filter is applied to a NHWC tensor (64× 14×9×64). Each request loads 64 elements along N, H, W dimensions, and 8 elements along C.

Figure 8B:
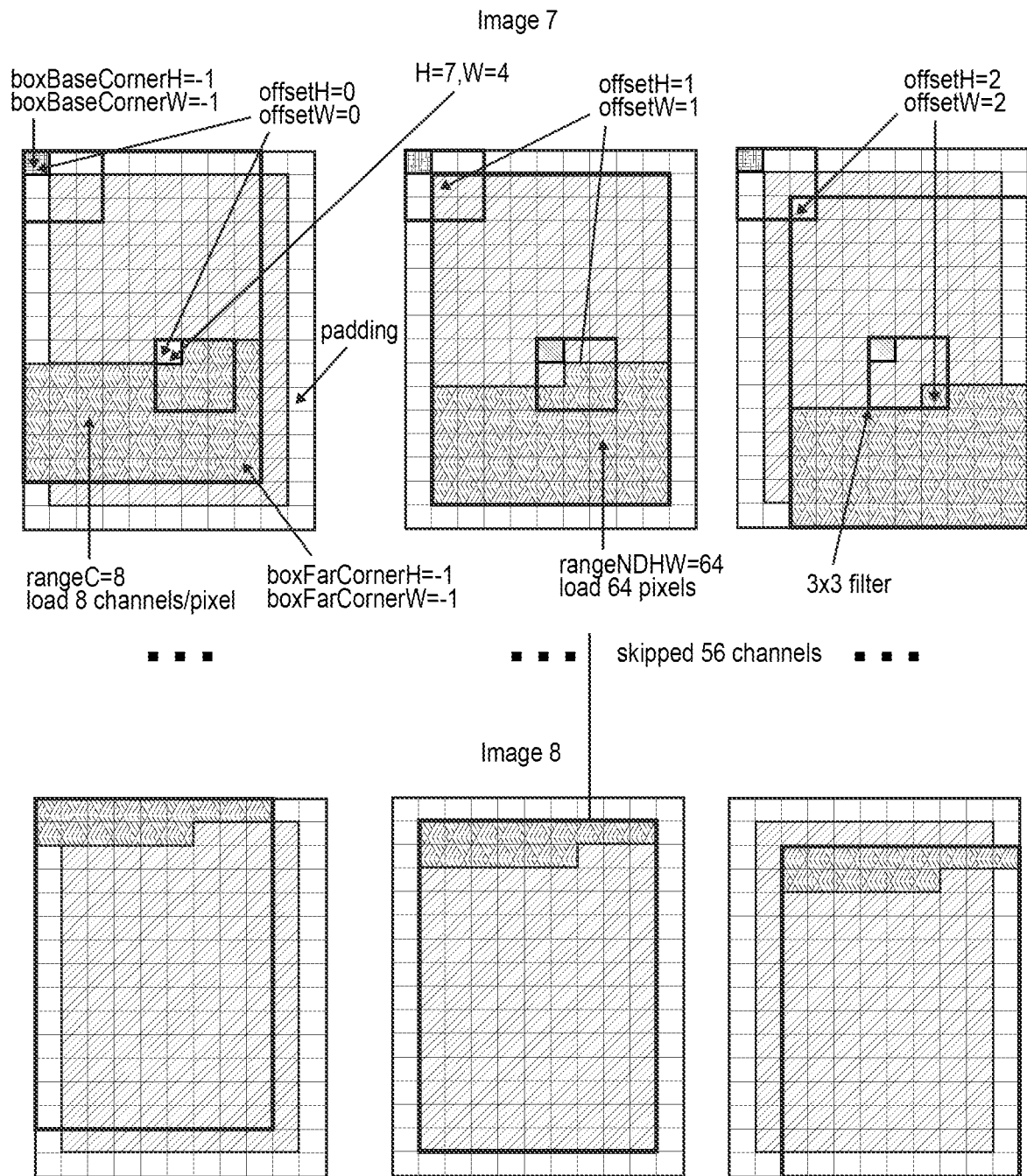

In the first example, shown in FIG. 8B, the filter can step outside of the tensor boundary accessing surrounding padding (border) that could be defined as zero or constant value. The tensor descriptor parameters are set up as following: tensorSize[0]=64; tensorSize[1]=9; tensorSize[2]=14; tensorSize[4]=64; rangeNDHW=64; rangeC=8; boxBaseCornerW=−1; boxBaseCornerH=−1; boxFarCornerW=−1; boxFarCornerH=−1. FIG. 8B illustrates processing for requests with coordinates (7, 7, 4, 0) and different coordinate offset values: (0, 0), (1, 1), (2, 2). This example shows loading different bounding areas of the tensor. They are defined as offsets. The requester specifies to the TMAU the bounding area and how many elements is required to be loaded (e.g., a range of elements—in this case 64). This can be specified as a parameter in the tensor descriptor. Another parameter, that may be provided at the instruction level, may specify a starting location for the block for loading the request. The TMAU knows that it has to load tensor elements starting from the specified starting location plus offsets stay within the rectangle shown and load a particular amount of data.

Figure 8C:
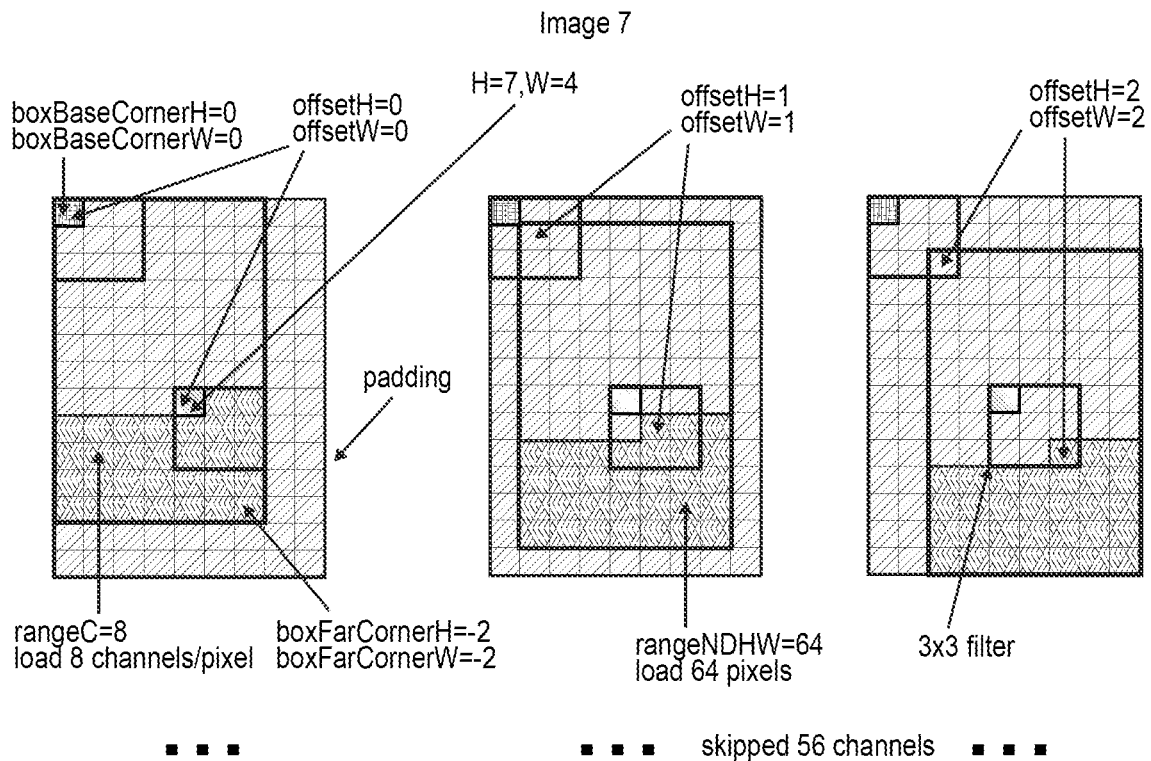
Figure 8C:
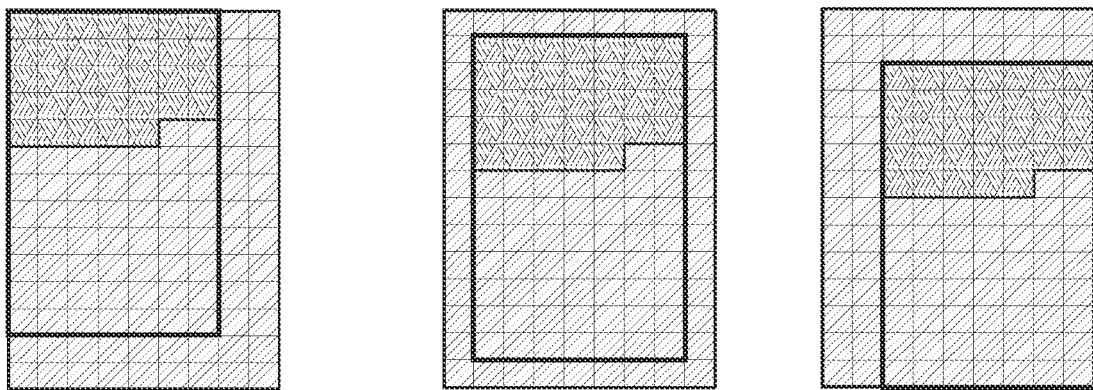

In the next example the filter is configured such that it must stay within the tensor boundaries, and therefore no padding/border is needed on the tensor. The tensor descriptor parameters are set up as following: rangeNDHW=64; rangeC=8; boxBaseCornerW=0; boxBaseCornerH=0; boxFarCornerW=−2; boxFarCornerH=−2. FIG. 8C illustrates processing for the requests with coordinates (7, 7, 4, 0) and different coordinate offset values: (0, 0), (1, 1), (2, 2).

For comparison, the handling of the similar convolution cases in the tiled mode is illustrated in the next examples. A single TMAU request may load all the pixels needed for convolution computation in all filter locations. In order to achieve this, the extra halo pixels have to be loaded. The number of the halo pixels depends on the filter size.

Figure 8D:
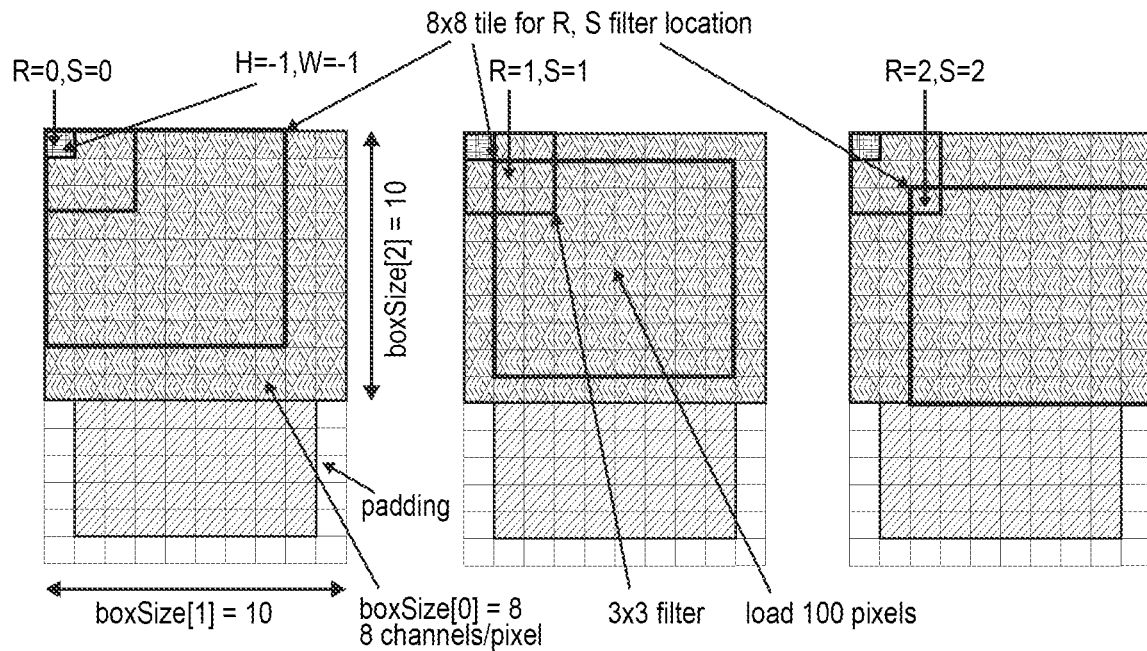

In the next example, a 3×3 convolution filter is applied to a NHWC tensor (64×14×8×64). The filter can step outside of the tensor boundary accessing surrounding padding (border) that could be defined as zero or constant value. The single request loads a 10×10 tile along H, W dimensions, and 8 elements along C. Each loaded 10×10 tile has 2 halo rows and 2 columns. The Tensor Descriptor parameters are set up as following: tensorSize[0]=64; tensorSize[1]=8; tensorSize[2]=14; tensorSize[4]=64; boxSize[0]=8; boxSize[1]=10; boxSize[2]=10; boxSize[3]=1. For any given filter location only an 8×8 tile is used for convolution calculations. FIG. 8D illustrates processing for the requests with coordinates (0, −1, −1, 0). Negative W, H block coordinates are needed to access pixels outside of the tensor boundary with zero or constant (padding). The 8×8 tiles are shown that are used to process different filter locations: (0, 0), (1, 1), (2, 2).

Figure 8E:
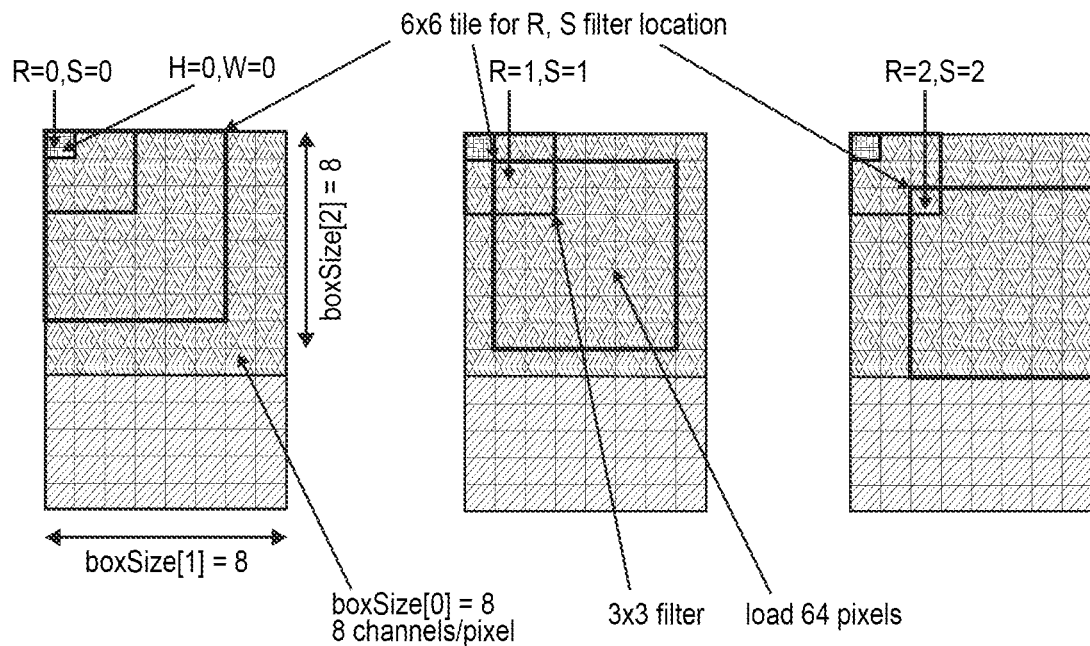

The following example is similar to the previous one, but the filter must stay within the tensor boundaries, and no padding/border is allowed. A single TMAU request loads a 8×8 tile along H, W dimensions, and 8 elements along C. Each loaded 8×8 tile has 2 halo rows and 2 columns. The tensor descriptor parameters are set up as follows: boxSize[0]=8; boxSize[1]=8; boxSize[2]=8; boxSize[3]=1. For any given filter location, a 6×6 tile is used for convolution calculations. Only 36 pixels are used for math at any given time. This is less than the optimal 64 pixels. This is an example of tile-quantization effect that may impact overall performance. FIG. 8E illustrates processing for the TMAU requests with coordinates (0, 0, 0, 0). Setting W, H block coordinates to zero prevents stepping outside of the tensor boundary. 6×6 tiles are shown that are used to process different filter locations: (0, 0), (1, 1), (2, 2).

The tensor descriptor traversalStride parameter impacts both tiled and im2col modes. In the tiled mode the bigger the traversalStride, the smaller the number of the tensor locations visited for the load, which reduces the total number of the loaded elements. In the im2col mode, for comparison, the number of the loaded elements along NDHW dimensions do not depend on the traversalStride along these dimensions: it is equal to the tensor descriptor rangeNDHW parameter. However, like the tiled mode, the number of elements traversed along W, H, and D dimensions is impacted by the traversalStride based on the formula ceil (boundingBox{D,H,W}/traversalStride{D,H,W}).

Figure 8F:
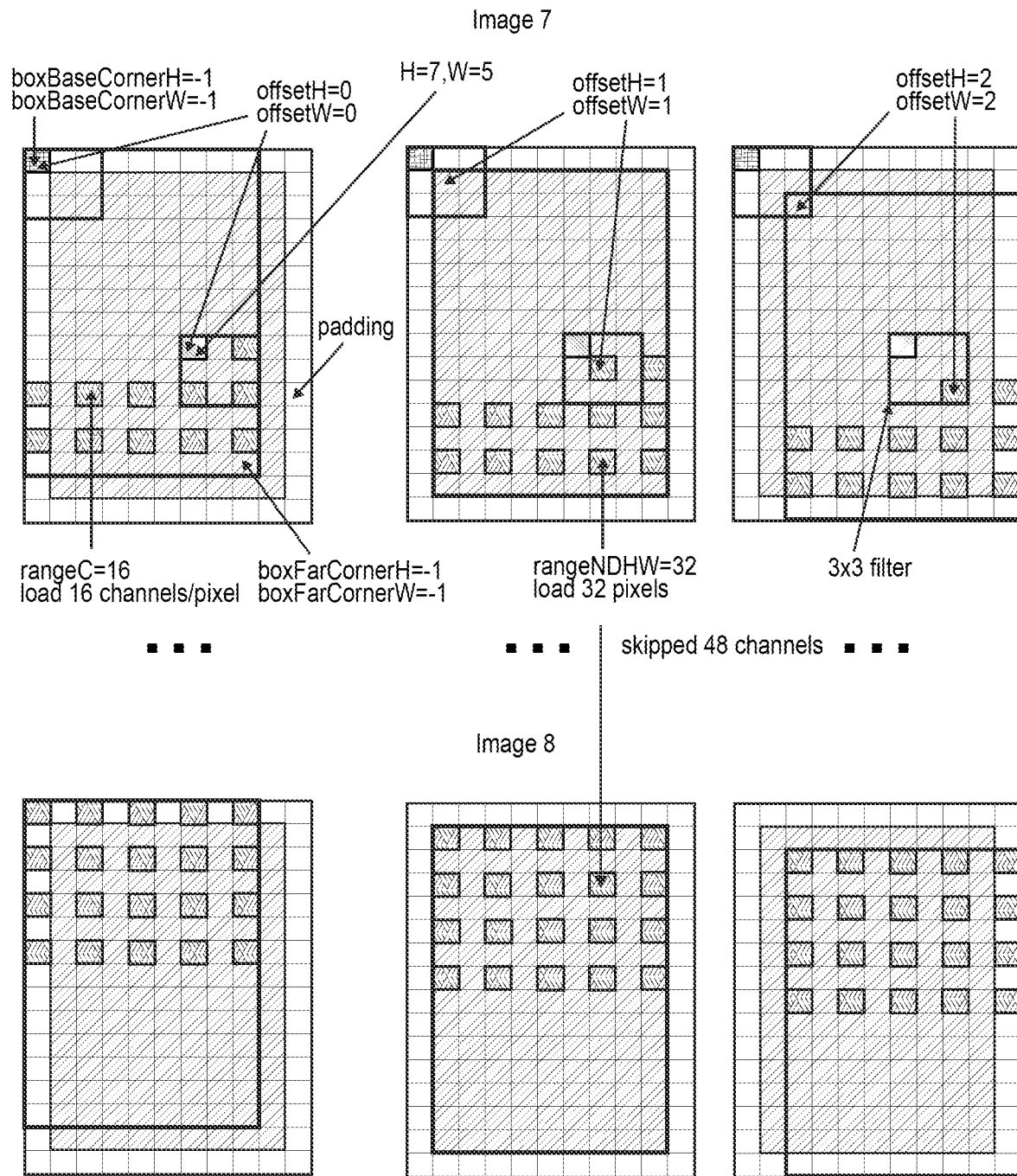

FIG. 8F illustrates traversalStride handling in im2col mode. A 3×3 convolution filter is applied to NHWC tensor (64×14×9×64) with traversalStride equal two. Each request loads 32 elements along N, H, W dimensions, and 16 elements along C. The tensor descriptor parameters are set up as the following: tensorSize[0]=64; tensorSize[1]=9; tensorSize[2]=14; tensorSize[4]=64; traversalStride=2; rangeNDHW=32; rangeC=16; boxBaseCornerW=−1; boxBaseCornerH=−1; boxFarCornerW=−1; boxFarCornerH=−1. FIG. 8B illustrates processing for the requests with coordinates (7, 7, 5, 0) and different coordinate offset values: (0, 0), (1, 1), (2, 2). Note that in this example pixels are loaded from the top row of the boundingBox, but not from the bottom row. They are also loaded from both first and last columns.

Figure 8G:
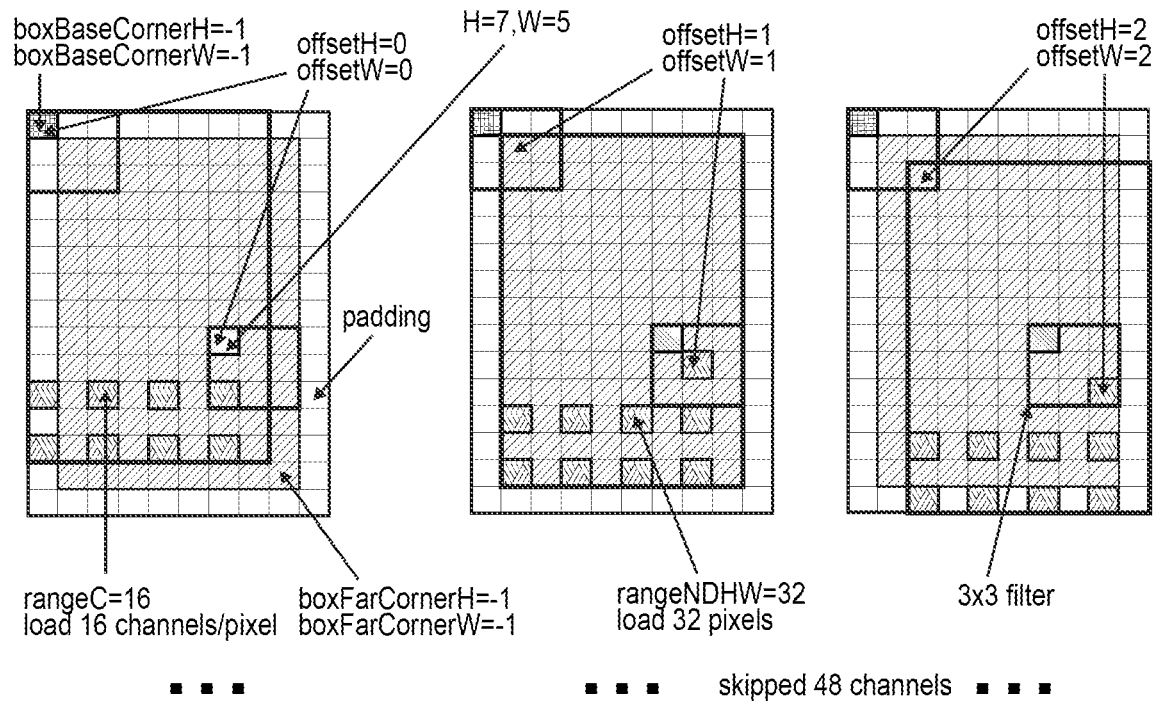
Figure 8G:
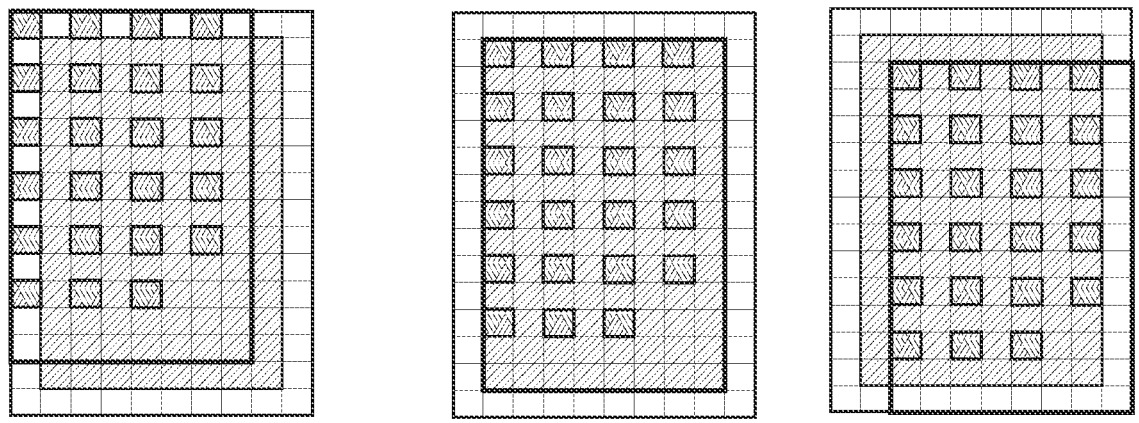

FIG. 8G illustrates slightly modified example where tensor size along W and H dimensions are reduced by one pixel: NHWC (64×13×8×64). Note that in this example pixels are loaded from both top and bottom rows of the boundingBox. They are not loaded from the last column, though.

Figure 8H:
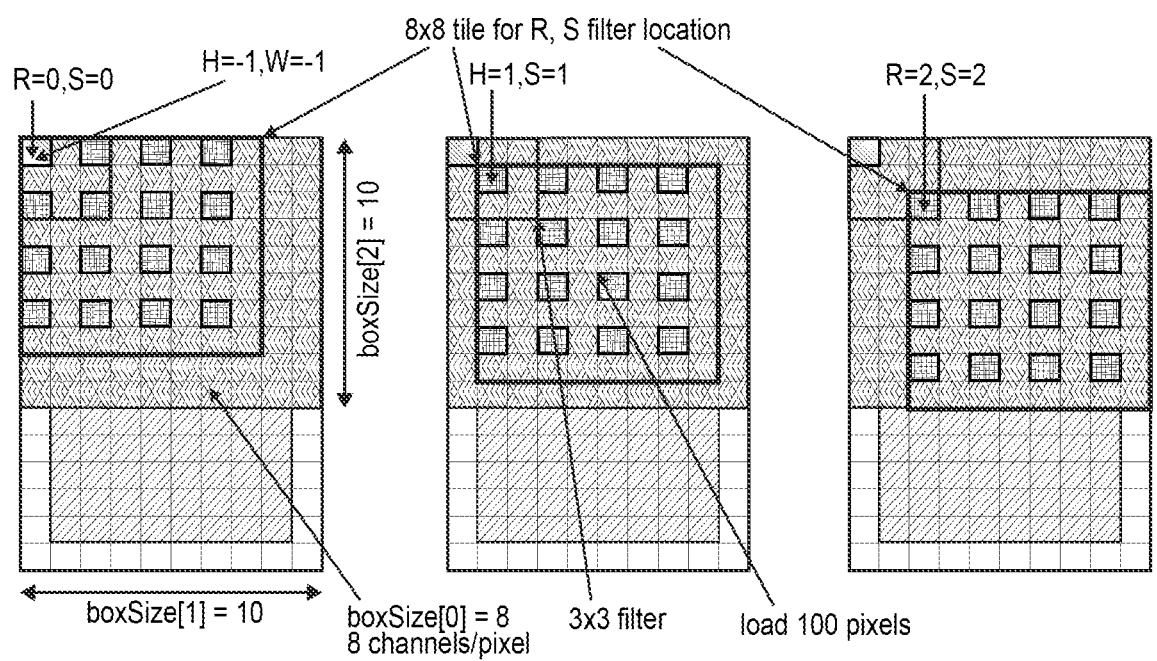

The next example, shown in FIG. 8H, illustrates traversalStride handling in the tiled mode. A 3×3 convolution filter is applied to a NHWC tensor (64×14×8×64) with traversalStride equal two. Similar to earlier examples with traversalStride equal one (FIG. 8D), a single TMAU request can provide pixels for all convolution filter locations by loading extra halo pixels.

Figure 8I:
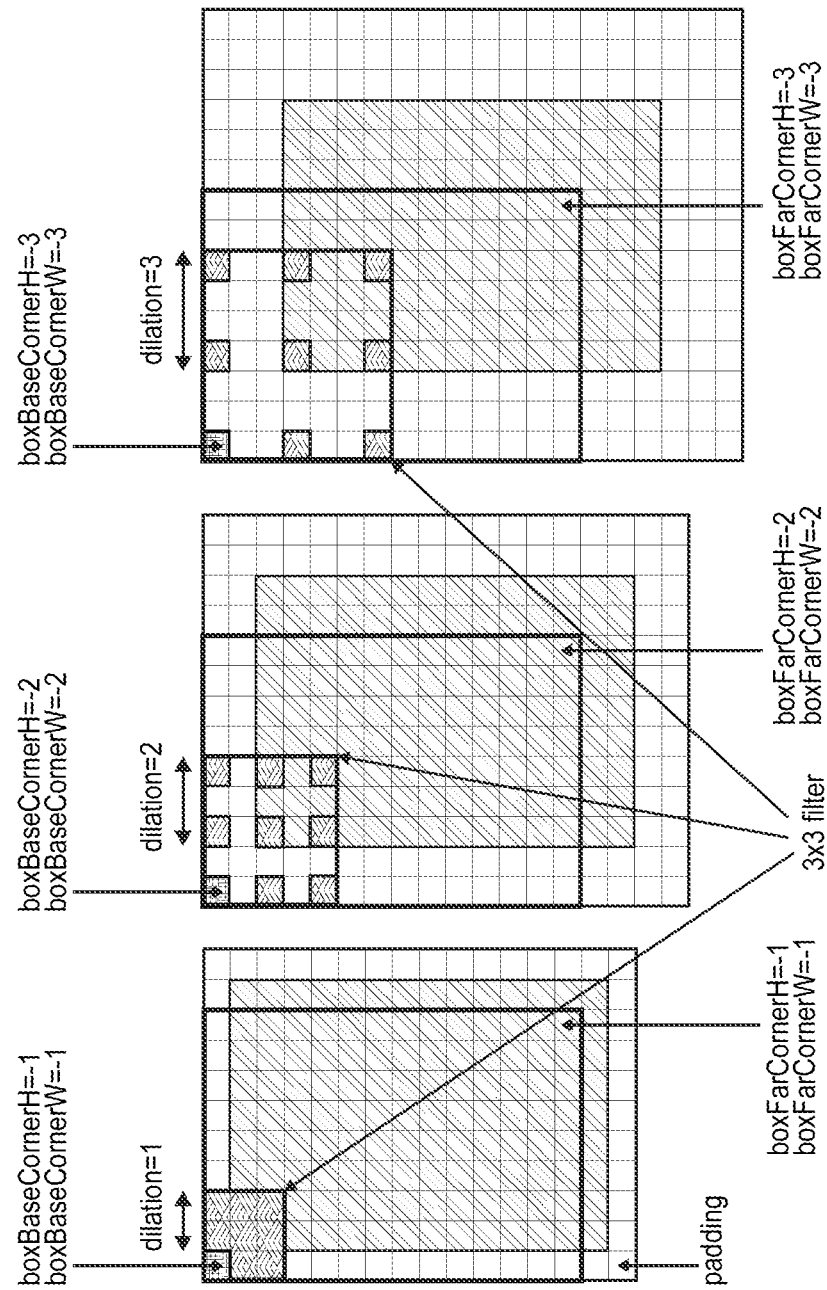

In some embodiments, the TMAU may not have dedicated hardware for convolution dilation handling and other TMAU circuitry may provide necessary support for this feature. However, precision of im2col coordinate offsets and bounding box corner coordinates is chosen to provide wide range of the convolution kernel sizes and dilation factors. FIG. 8I illustrates how the dilation factor affects bounding box settings for the 3×3 convolution filter. Note, that the dilation impacts the box location but not the size.

Figure 8J:
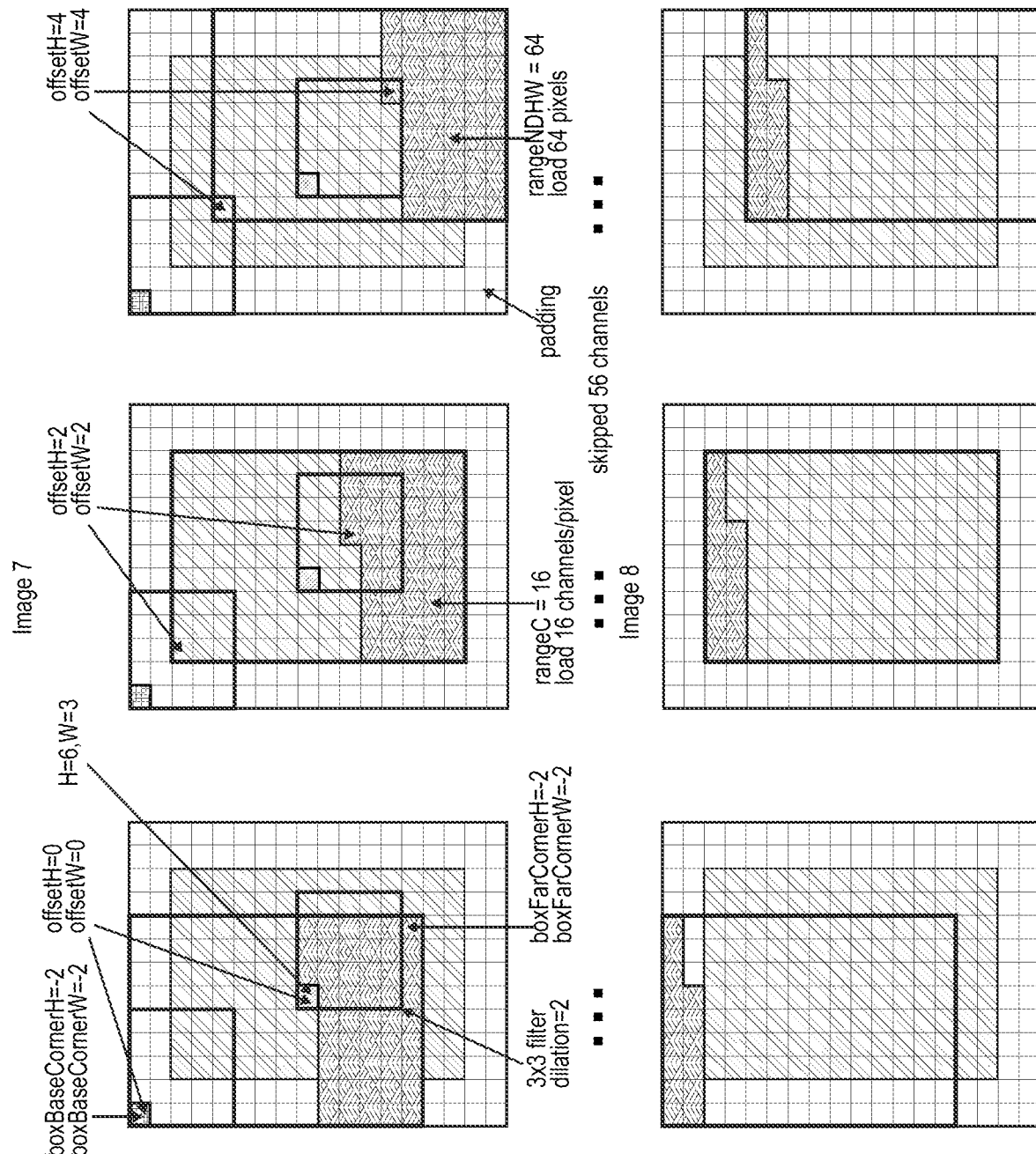

FIG. 8J illustrates how a dilation factor of two is handled in im2col mode. A 3×3 convolution filter is applied to a NHWC tensor (64×14×9×64). Each request loads 64 elements along N, H, W dimensions, and 16 elements along C. The tensor descriptor parameters are set up as the following: tensorSize[0]=64; tensorSize[1]=9; tensorSize[2]=14; tensorSize[4]=64; rangeNDHW=64; rangeC=16; boxBaseCornerW=−2; boxBaseCornerH=−2; boxFarCornerW=−2; boxFarCornerH=−2. FIG. 8J illustrates processing for the requests with coordinates (7, 6, 3, 0) and different coordinate offset values: (0, 0), (2, 2), (4, 4).

Figure 8K:
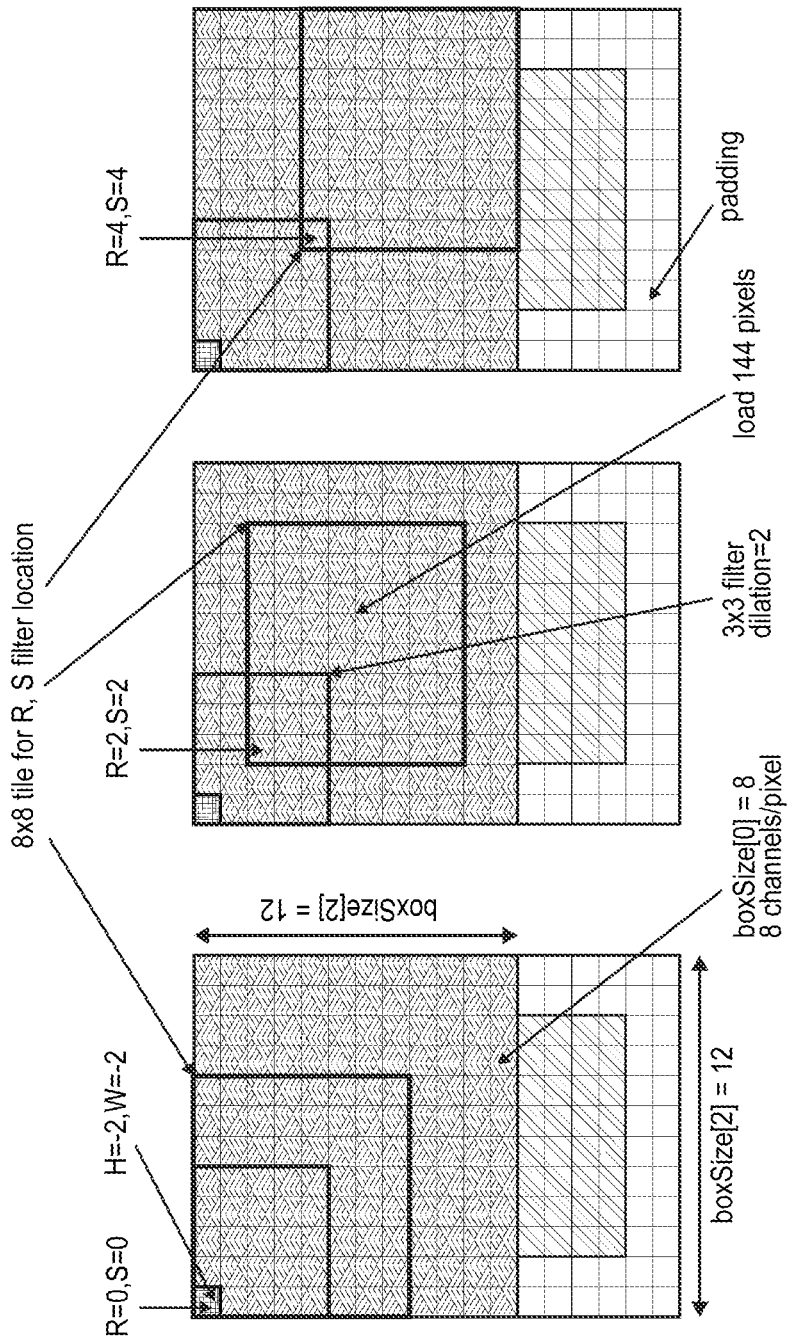

FIG. 8K illustrates how a similar example to FIG. 8J is handled in the tiled mode. A single TMAU request can provide pixels for all convolution filter locations by loading extra halo pixels. The number of the halo pixels depends on the filter size and dilation factor. A 3×3 convolution filter is applied to a NHWC tensor (64×14×8×64). A single request loads 12×12 tiles along H, W dimensions, and 8 elements along C. Each loaded 12×12 tile has 4 halo rows and 4 columns. The tensor descriptor parameters are set up as following: tensorSize[0]=64; tensorSize[1]=8; tensorSize[2]=14; tensorSize[4]=64; boxSize[0]=8; boxSize[1]=12; boxSize[2]=12; boxSize[3]=1. For any given filter location only a 8×8 tile is used for convolution calculations. FIG. 8K illustrates processing for the requests with coordinates (0, −2, −2, 0). Negative W, H block coordinates needed to access pixels outside of the tensor boundary with zero or constant (padding). 8×8 tiles are shown that are used to process different filter locations: (0, 0), (2, 2), (4, 4).

Support for Tensor Data Swizzling

In many applications, the TMAU loads data in the shared memory in the same order as they are laid out in global memory. However, there are applications when extra data movements are required to avoid performance degradation. This may be implemented as an application dependent optimization. The TMAU supports a non-swizzled mode in which data is written to the shared memory in the same arrangement it is in global memory, and a swizzled mode in which data is written to shared memory in accordance with a predetermined or configurable swizzle pattern that that results in a different arrangement of the data than that in the global memory. When the TMAU processes a memory access request, it may generate multiple external memory requests, and for each of the generated external memory requests it may generate a corresponding destination address and swizzling pattern for the target shared memory. Two options for tracking the destination addresses and swizzling patterns may be used in implementations—either sending all the information through the memory system with the request and response, or store the information in a tracking table in the SM and send the corresponding index into this table through the memory system with the request and response. In either case the memory system response may use this information to determine the address and pattern for writing the data in the target shared memory.

In some embodiments, L2 cache lines are organized in four 32B sectors. Shared memory is organized in groups of 8 banks, 4 groups total. There is a flexibility in mapping four sectors in the cache line to a specific bank groups: any sector could be mapped to any group, one sector per group. In addition, 16B sector halves could be swapped within the sector. This provides extra flexibility in mapping 16B quantities to 4-bank subgroups.

Data are organized in specific order in global memory; however, it may not match the order in which data are accessed by application in the shared memory. A good example is a row-first matrix organization versus column-first access. This difference in data organization may cause bank conflicts when shared memory is accessed. In order to avoid this problem data could be loaded to shared memory with shuffling across shared memory banks. The L2 cache line sectors are mapped to the shared memory bank groups and subgroups based on the predefined patterns that guaranty avoidance of bank conflicts both for reads and writes. The TMAU supports multiple patterns based on the specific tensor layouts. In turn the data consumer must be aware of these patterns and access the data accordingly.

In some embodiments, the TMAU can swizzle data being loaded into a shared memory that is organized in terms of lines. In an example, the shared memory is organized in lines, where each line is 128 B (128 byte) and has a unique address. The shared memory bank swizzling pattern may be encoded in 8×8 tables where each entry represents bank sub-group ID for 16B sub-blocks within a 128B data block.

The appropriate line from the table is selected based on the last 3 bits of the destination shared memory address (line ID). Note that the bits are taken from the logical address within CTA shared memory region. It's an offset from the region base address. It's not necessarily the same as the shared memory physical address.

In FIG. 9A, an example bank allocation table for a swizzle 128B mode is shown.

Figure 9B:
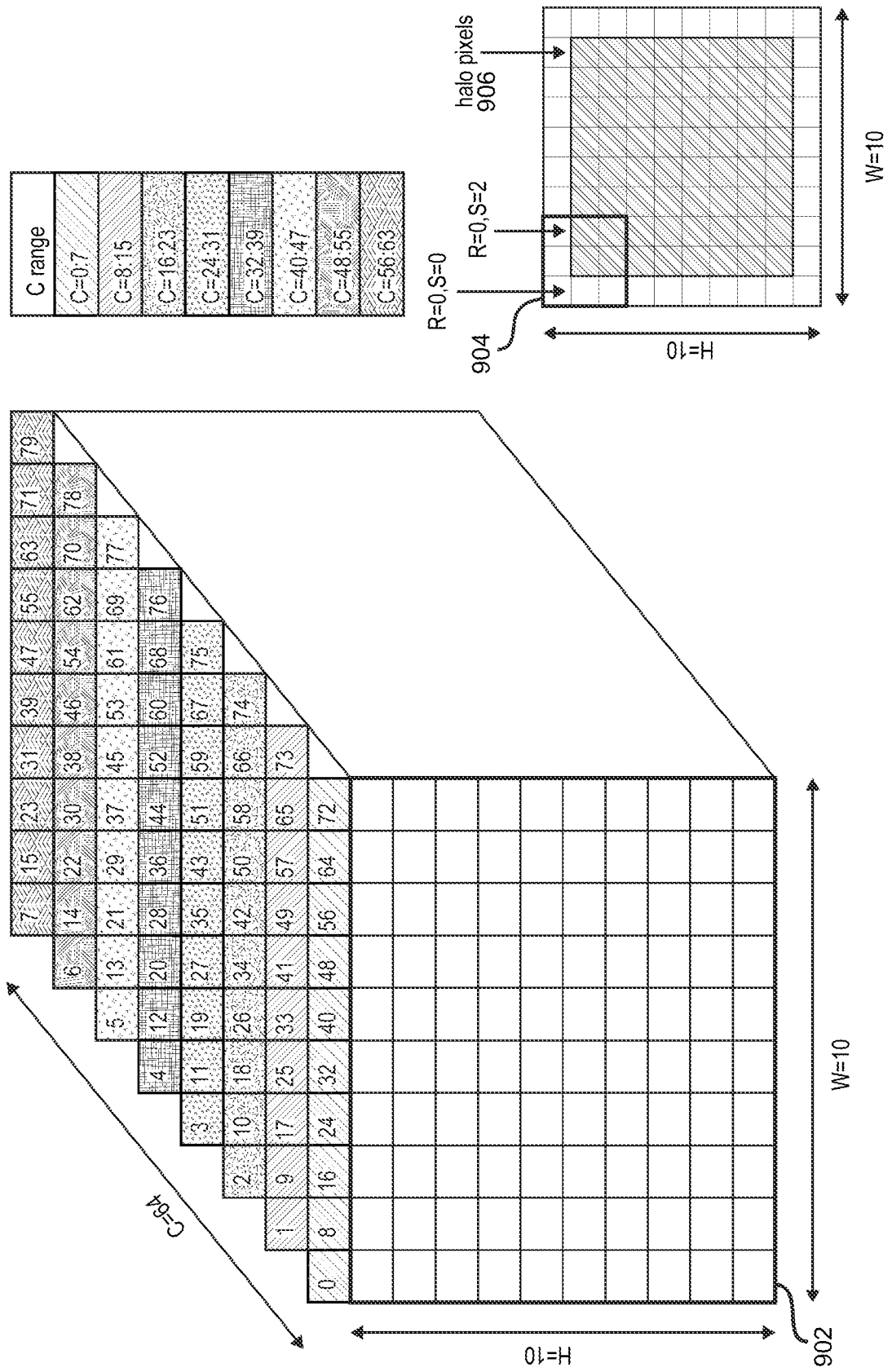
Figure 9D:
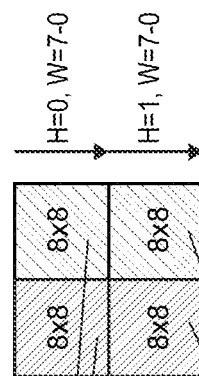

FIGS. 9B-9D illustrate an example data layouts in global and shared memories for swizzle_128B mode in accordance with the bank allocation table of FIG. 9A. FIG. 9B shows a 4-dimensional NHWC tensor with 1×10×10×64 (i.e. N=1, H=10, W=10 and C=64) dimensions in the global memory. With 2B/channel and 64 channels occupying 128B. Each enumerated cell, sometimes also referred to as a pixel, represents 8 channels (16B). The W and H sizes of an image 902 are each 10 and includes halo pixels 906 to support a 3×3 convolution filter 904 along the 8×8 image tile. During processing the convolution filter is moved left-right and top-bottom iteratively one pixel at a time. Cells are enumerated in FIGS. 9A-D in the order they are stored in global memory. Channel ranges are presented in different hatch patterns.

FIG. 9C shows a part of the tensor shown in FIG. 9B in the global memory for H=0, and 1. Each row of cells in FIG. 9C represents single 128B L2 cache line. FIG. 9D illustrates how the same data are stored in the shared memory according to an embodiment. Each row represents 128B of data distributed across memory banks. Data are swizzled based on the table for swizzle_128B mode. On the right in FIG. 9D, the data view from the GMMA application's perspective is shown for filter location R=0, S=–0. The GMMA must be aware of the bank swizzling and strides to feed the right data in 16 8×8 tiles.

The swizzling accommodates for implementations in which the order in which data is stored in global memory is not the same order in which that data is stored in shared memory. When the data is moved from global memory to shared memory, in some embodiments the TMAU provides for scrambling the data because the SM, for some applications, reads the data vertically (e.g. in columns of data). Moreover, the memory bank layout in the shared memory is taken into account by the TMAU, when it is writing to shared memory, in order to optimize the SM's subsequent read access to that data. In the illustrated example, the shared memory is organized in banks, and specifically in 8 banks. At any given clock, each bank is read but only a small piece of data from any given bank can be read. In the figures, each hatch pattern represents data written to a different bank in the shared memory in accordance with the swizzle pattern for the tensor. If the data from H=0 W=0-7 is to be read from shared memory and if that data in the shared memory is arranged in the same manner as in the global memory, it would take 8 clock cycles to read that data while avoiding bank conflict. Thus, as shown in FIG. 9D on the left side, the data from H=0 W=0-7 is spread over all eight banks in the shared memory so that all of that data (i.e. the data from H=0 W=0-7) can be read in parallel across the 8 banks. This increases the data throughput per clock.

On the right side of FIG. 9D, the right most column shows the 8×8 tiles for each H when W=0, the arrows indicating the locations in shared memory at which the tiles for H=0, W=0 and H=1, W0 (enumerated tiles 0 and 80 respectively) are written. Similarly, in the second column from the right, the 8×8 tiles for each H when W=1 are shown, the arrows indicating the locations in shared memory at which the tiles for H=0, W=1 and H=1, W=1 (enumerated tiles 0 and 80 respectively) are written The swizzling is performed according to a preconfigured table such as the table shown in FIG. 9A in the TMAU.

GMMA in some embodiments is a fixed function hardware unit in the GPU tensor cores that is configured to perform matrix to matrix multiply into an accumulator. For example, two 16×16 matrices may be multiplied by the GMMA into an accumulation matrix. In some embodiments, the GMMA may be limited to matrices smaller than a predefined size. When two matrices are to be multiplied, the GMMA is a consumer of data that is fed, in example embodiments, by the TMAU. When a matrix-matrix multiplication is required in a computational kernel running on an SM, the kernel request may request the TMAU to copy the data for each of the two matrices into shared memory, and then issue a request for a matrix-matrix multiplication to GMMA. GMMA, in response, may perform its multiplication operation using the data that has been loaded to the shared memory by the TMAU. If swizzling is used, the kernel may read the data in the shared memory according to the swizzle pattern information, perform its calculation, and then write the results back to shared memory. The swizzling is performed according to a preconfigured table such as the table shown in FIG. 9A in the TMAU.

The GMMA circuitry may be configured in some embodiments to read data from shared memory in 8×8 pixel tiles as shown on the right side of FIG. 9D. In order to obtain the data for the position R=0, S=0 (see FIG. 9B indication of R=0 S=0 in unswizzled image in global memory), all channels 0-63 for position R=0 S=0 need to be read from shared memory. For the first 8×8 pixel tile read by the GMMA, as shown in the top right tile on the right side of FIG. 9D, for position R-0 S=0 pixels for channels C=0-7 of H=0 W=0-7 is read. Since the data is swizzled in shared memory as shown in FIG. 9D, all channels 0-63 for eight positions including R=0, S=0 can be read in eight clock cycles.

The GMMA operation may be invoked by a convolution kernel over an image 902 such as that shown in FIG. 9B using a 3×3 convolution filter 904. For each position, the R=0 S=0 etc., the filter requires matrix multiplication to be performed for the 3×3 box in which that position is the top left position as shown in FIG. 9B lower right. However, the GMMA circuitry may read an 8×8 tile for in each read.

Multicast Support

The TMAU provides support for programmatic multicast where a single TMAU generates a load request, but data are delivered to multiple destinations (e.g., SMs). For example, in response to a load request from a kernel executing on a first SM, the TMAU coupled to the first SM requests a block of tensor data or other data from global memory and, in addition to writing it to the shared memory of the first SM (it is not required in some embodiments that the requesting SM receives the requested data), also writes it to the shared memories of one or more other SMs. To support this, feature the requesting TMAU is provided with the list of receiving CTAs. In some embodiments, the receiving CTA IDs may be encoded in a 16-bit mask where each bit corresponds to specific CTA ID. In some embodiments, a data request with multicast option initiates TMAU multicast requests. The mask for the destination CTAs may be encoded in the destination address that is provided to the instructions.

Each receiver CTA needs to detect the transaction completion. The completion detection may be based on an arrive/wait synchronization mechanism. For example, each received packet may include the shared memory address for the corresponding arrive/wait structure location, and the counter in the structure can be updated in accordance with the number of the received data bytes. The receiver CTA may implement synchronization based on a barrier or the like on the counter.

In order to support preemption, the TMAU keeps track of the received data packets in order to detect completion of the transaction. In the typical case all book-keeping is organized locally inside the TMAU. However, in the multicast case the requesting TMAU must account for the transaction completion at all the receivers. Therefore, additional acknowledgement mechanism may be established across multiple TMAUs. Every time the TMAU receives the data it must communicate the event to the requesting TMAU. The requesting TMAU accounts for the total number of the received data packages across all the receivers. An example multicast implementation that can be implemented using the TMAU is described in U.S. application Ser. No. 17/691,288, titled "Programmatically Controlled Data Multicasting Across Multiple Compute Engines", which is hereby incorporated by reference in its entirety.

Prefetch Support

In addition to loading tensor data, the TMAU supports data prefetch requests to prefetch data from global memory DRAM to L2 cache. This provides an opportunity to reduce tensor load latency and to improve overall performance. The prefetch may especially be advantageous for multicast operations where latency impacts execution of the multiple CTAs. The prefetch request handling is similar to that of other load operations, but without the TMAU having to perform any type of completion tracking or the like. For tensor data, the prefetch requests handling is somewhat similar to the load operation where tensor descriptor and coordinates define how to process the request. However, with respect to prefetch requests for tensor data, the TMAU may not handle shared memory/global alignment and process requests at sector or cache line granularity.

Store and Reduction Requests

The TMAU store request copies a block of data from shared to global memory. The data in shared memory are processed sequentially as a linear address space; however, the destination memory is treated as multidimensional tensor. The maximum dimensionality is the same as for load requests.

Like with TMAU loads, the TMAU store requests are provided with the tensor descriptor pointer, shared memory base address and coordinates of the destination block in the tensor space. The store requests can be executed in both tiled and im2col modes. The store requests may also support interleaved layouts, and shared memory bank swizzling patterns may be specified. The store with traversal stride may be supported. In some embodiments, the store operation may also support handling of the out-of-bound conditions with ZFILL/CFILL. In addition, the TMAU in certain embodiments supports store with reduction for data copying from shared to global or shared to shared memories. Supported reduction operations may include any of, but are not limited to, AND, ADD, XOR, MIN, MAX, DEC, OR, and INC.

Descriptor-Less Requests

A wide range of applications do memory-to-memory transactions that do not require knowledge of the underlying data layouts. In this case data are treated as sequential array of blocks of a predetermined size. In some embodiments, for example, a default block size of 16 B may be configured for TMAU operations. The memory access request for a non-tensor block of data is significantly simpler that a request for a tensor, and in some embodiments requires only a source address, destination address, and number of blocks to perform the transfer. All these parameters can be specified at the instruction level (i.e. provided in the request to the TMAU) without need of an associated tensor descriptor stored in the global memory. This simplifies the programming model since the step of tensor descriptor definition can be eliminated for such memory access requests. If the number of blocks to transfer is zero, then these instructions as handled as a null operation (NOP).

The TMAU supports dedicated instructions for descriptor-less data transfers (also referred to as non-tensor data requests). Such instructions can be used to copy data from global to shared, shared to global, and shared to shared memories. In another embodiment global to global copy may be implemented. In addition, another instruction does reduction with data copy from shared to global or shared to shared memories. Supported reduction operations may include any of, but are not limited to, AND, ADD, XOR, MIN, MAX, DEC, OR, and INC. The TMAU supports descriptor-less data prefetch requests from DRAM to L2.

Synchronization and Transaction Completion

The TMAU supports a request completion event. In some embodiments an arrive/wait barrier is used as a completion detection mechanism. Each TMAU load request expects shared memory address where the barrier structure is located. The TMAU includes this address in each L2 request. When data arrives to the destination SM the barrier structure is updated accordingly. The TMAU itself is not involved in the barrier update. This mechanism may be used for both unicast and multicast requests.

In addition, the TMAU supports dedicated instruction that could be used to detect completion of all previously issued TMAU requests.

Programming Model for the TMAU

The TMAU is designed to move big blocks of tensor or other data between global and shared memories. A single TMAU load request can bring kilobytes, megabytes or even larger amounts of data that could be processed by multiple threads and CTAs. Similarly, large blocks of shared memory data generated by a large thread array could be saved by a single TMAU store operation to the global memory in tensor or other form.

The scalar nature of TMAU requests is not well aligned with multi-threaded nature of CUDA programming paradigm. Therefore, some embodiments provide an intuitive and non-disruptive programing model that can be integrated with the CUDA environment to provide for utilizing the TMAU in applications. The programming model provides flexibility for program development and is intuitive and easy to learn for the application developers.

In the typical DL application, it is expected that the TMAU is used in an iterative way. Multiple CTAs iterate through the tensors stored in global memory by accessing different tiles. In each iteration tensor blocks (tiles) are extracted and processed. For each block, the application determines block location in tensor space by computing multidimensional coordinates. In addition, application has to calculate shared memory addresses that used to store the blocks.

The scalar nature of the TMAU instructions makes Uniform Data Path (UDP) and Uniform Register File (URF) an efficient execution venue. This applies not just to the TMAU instructions but also surrounding code that generates necessary instruction parameters. This approach would eliminate code execution redundancy, save RF capacity, bandwidth, save power and free vector data path. Because of the iterative nature of the TMAU related code it is important to keep iterated parameters resident in URF. Any URF/RF load/store would cause loss in performance and extra power consumption.

In some embodiments a mechanism is provided that assists compiler to recognize warps-single semantics of the nearby code-blocks and be expressed through CUDA and PTX (Parallel Thread Execution instruction set architecture). A modification adds ".one" modifier. In the following code the proposed modifier forces single thread to be selected for the execution:

```
_warpsync.exclusive.one mask, L1;
    <code block executed by single thread>
```

The execution thread is selected from the set of active threads defined by the mask. It is important that the same thread is consistently selected every time the code-block is executed. Note that _warpsync.exclusive causes all the threads to be synchronized before and after the code-block execution. The proposed programming model may simplify code analyzes and provides opportunity to generate TMAU-related code for UDP execution and keep relevant data resident in URF.

The CUDA-level model is on top of the PTX structure where the single thread is consistently selected for the code-block execution. In the following code _one_sync (mask) function provides desirable functionality:

```
if (__one_sync(mask) ) {
    <code block executed by single thread>
} // no 'else' clause
```

The TMAU-based access is implemented in some embodiments through a set of functions. Four C-style groups are defined to cover the following cases: tiled load with L2 descriptor, tiled load without tensor descriptor, im2col load with tensor descriptor, and im2col load without tensor descriptor. The functions may take as input parameters tensor descriptor pointer, shared memory destination address, shared memory address for arrive/wait barrier, set of tensor coordinates for the access block origin, pipeline structure, and optional tensor descriptor. The im2col group also expects coordinate offsets within convolution kernel.

In an example embodiment, a kernel executing on the SM may issue a memory access request to the TMAU to copy a tensor between global and shared memories with the tensor copy instruction in a form such as:

```
copy_tensor.mode.dimensionality.destination,source{.multicast}
{reduction_op}
    descriptor coordinates SMEM_data_address {SMEM_barrier_addr}
    {im2col_coordinate_offsets} multicast_destinations
where mode = {tiles, im2col}, dimensionality = {1D-5D}, destination =
{shared, global},
source = {shared, global}. Multicast, reduction_op= {.AND, .ADD, .XOR,
.MIN, MAX, .DEC, .OR, .INC}.
```

A memory access request to the TMAU to prefetch tensor data to L2 cache may be issued with a tensor prefetch instruction in a form such as: prefetch_tensor.mode.dimensionality descriptor coordinates

```
im2col_coordinate_offsets}
``` where mode={tiles, im2col} and dimensionality={1D-5D}.

A memory access request to the TMAU to copy a block of non-tensor data between global and shared memory may be issued with a block copy instruction in a form such as:

```
copy_block.destination,
    source{.multicast}{reduction_op}
    destination_address {barrier_addr} source_ad-
    dress multicast_destinations number_blocks
``` where destination={shared, global}, source={shared, global}, multicast, and reduction_op={.AND, .ADD, .XOR, .MIN, .MAX, .DEC, .OR, .INC}.

A memory access request to the TMAU to prefetch a block of non-tensor data from global memory to the L2 cache may be issued with a block prefetch instruction in a form such as:

```
prefetch_block address number_blocks.
```

Example Parallel Processing GPU Architecture With TMAU

An example illustrative architecture in which the TMAU disclosed in this application is incorporated will now be described. The following information is set forth for illustrative purposes and should not be construed as limiting in any manner. Any of the following features may be optionally incorporated with or without the exclusion of other features described.

Figure 10:
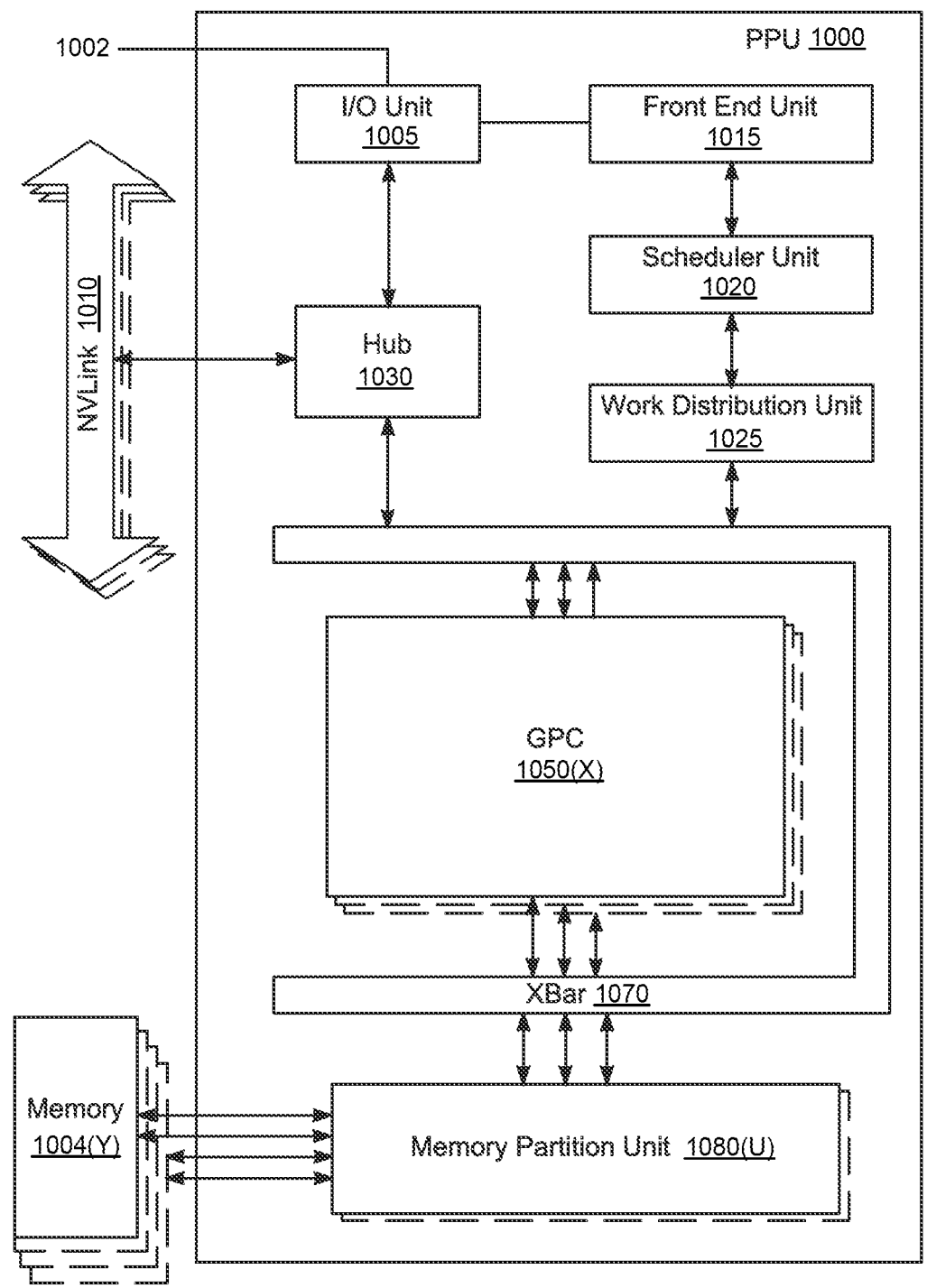
FIG. 10 illustrates an example parallel processing unit of a GPU, according to some embodiments.

FIG. 10 illustrates a parallel processing unit (PPU) 1000, in accordance with an embodiment. In an embodiment, the PPU 1000 is a multi-threaded processor that is implemented on one or more integrated circuit devices. The PPU 1000 is a latency hiding architecture designed to process many threads in parallel. A thread (e.g., a thread of execution) is an instantiation of a set of instructions configured to be executed by the PPU 1000. In an embodiment, the PPU 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1000 may be utilized for performing general-purpose computations. In some other embodiments, PPU 100 configured to implement large neural networks in deep learning applications or other high performance computing applications.

One or more PPUs 1000 may be configured to accelerate thousands of High Performance Computing (HPC), data center, and machine learning applications. The PPU 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the PPU 1000 includes an Input/Output (I/O) unit 1005, a front end unit 1015, a scheduler unit 1020, a work distribution unit 1025, a hub 1030, a crossbar (Xbar) 1070, one or more general processing clusters (GPCs) 1050, and one or more partition units 1080. The PPU 1000 may be connected to a host processor or other PPUs 1000 via one or more high-speed NVLink 1010 interconnect. The PPU 1000 may be connected to a host processor or other peripheral devices via an interconnect 1002. The PPU 1000 may also be connected to a memory comprising a number of memory devices 1004. In an embodiment, the memory 1004 may comprise a number of dynamic random access memory (DRAM) devices. The DRAM devices may be configured as a high-bandwidth memory (HBM) subsystem, with multiple DRAM dies stacked within each device.

The NVLink 1010 interconnect enables systems to scale and include one or more PPUs 1000 combined with one or more CPUs, supports cache coherence between the PPUs 1000 and CPUs, and CPU mastering. Data and/or commands may be transmitted by the NVLink 1010 through the hub 1030 to/from other units of the PPU 1000 such as one or more copy engines, a video encoder, a video decoder, a power management unit, etc. (not explicitly shown). The NVLink 1010 is described in more detail in conjunction with FIG. 13A and FIG. 13B.

The I/O unit 1005 is configured to transmit and receive communications (e.g., commands, data, etc.) from a host processor (not shown) over the interconnect 1002. The I/O unit 1005 may communicate with the host processor directly via the interconnect 1002 or through one or more intermediate devices such as a memory bridge. In an embodiment, the I/O unit 1005 may communicate with one or more other processors, such as one or more of the PPUs 1000 via the interconnect 1002. In an embodiment, the I/O unit 1005 implements a Peripheral Component Interconnect Express (PCIe) interface for communications over a PCIe bus and the interconnect 1002 is a PCIe bus. In alternative embodiments, the I/O unit 1005 may implement other types of well-known interfaces for communicating with external devices.

The I/O unit 1005 decodes packets received via the interconnect 1002. In an embodiment, the packets represent commands configured to cause the PPU 1000 to perform various operations. The I/O unit 1005 transmits the decoded commands to various other units of the PPU 1000 as the commands may specify. For example, some commands may be transmitted to the front end unit 1015. Other commands may be transmitted to the hub 1030 or other units of the PPU 1000 such as one or more copy engines, a video encoder, a video decoder, a power management unit, etc. (not explicitly shown). In other words, the I/O unit 1005 is configured to route communications between and among the various logical units of the PPU 1000.

In an embodiment, a program executed by the host processor encodes a command stream in a buffer that provides workloads to the PPU 1000 for processing. A workload may comprise several instructions and data to be processed by those instructions. The buffer is a region in a memory that is accessible (e.g., read/write) by both the host processor and the PPU 1000. For example, the I/O unit 1005 may be configured to access the buffer in a system memory connected to the interconnect 1002 via memory requests transmitted over the interconnect 1002. In an embodiment, the host processor writes the command stream to the buffer and then transmits a pointer to the start of the command stream to the PPU 1000. The front end unit 1015 receives pointers to one or more command streams. The front end unit 1015 manages the one or more streams, reading commands from the streams and forwarding commands to the various units of the PPU 1000.

The front end unit 1015 is coupled to a scheduler unit 1020 that configures the various GPCs 1050 to process tasks defined by the one or more streams. The scheduler unit 1020 is configured to track state information related to the various tasks managed by the scheduler unit 1020. The state may indicate which GPC 1050 a task is assigned to, whether the task is active or inactive, a priority level associated with the task, and so forth. The scheduler unit 1020 manages the execution of a plurality of tasks on the one or more GPCs 1050.

The scheduler unit 1020 is coupled to a work distribution unit 1025 that is configured to dispatch tasks for execution on the GPCs 1050. The work distribution unit 1025 may track a number of scheduled tasks received from the scheduler unit 1020. In an embodiment, the work distribution unit 1025 manages a pending task pool and an active task pool for each of the GPCs 1050. The pending task pool may comprise a number of slots (e.g., 32 slots) that contain tasks assigned to be processed by a particular GPC 1050. The active task pool may comprise a number of slots (e.g., 4 slots) for tasks that are actively being processed by the GPCs 1050. As a GPC 1050 finishes the execution of a task, that task is evicted from the active task pool for the GPC 1050 and one of the other tasks from the pending task pool is selected and scheduled for execution on the GPC 1050. If an active task has been idle on the GPC 1050, such as while waiting for a data dependency to be resolved, then the active task may be evicted from the GPC 1050 and returned to the pending task pool while another task in the pending task pool is selected and scheduled for execution on the GPC 1050.

The work distribution unit 1025 communicates with the one or more GPCs 1050 via XBar 370. The XBar 1070 is an interconnect network that couples many of the units of the PPU 1000 to other units of the PPU 1000. For example, the XBar 1070 may be configured to couple the work distribution unit 1025 to a particular GPC 1050. Although not shown explicitly, one or more other units of the PPU 1000 may also be connected to the XBar 1070 via the hub 1030.

The tasks are managed by the scheduler unit 1020 and dispatched to a GPC 1050 by the work distribution unit 1025. The GPC 1050 is configured to process the task and generate results. The results may be consumed by other tasks within the GPC 1050, routed to a different GPC 1050 via the XBar 1070, or stored in the memory 1004. The results can be written to the memory 1004 via the partition units 1080, which implement a memory interface for reading and writing data to/from the memory 1004. The results can be transmitted to another PPU 1004 or CPU via the NVLink 1010. In an embodiment, the PPU 1000 includes a number U of partition units 1080 that is equal to the number of separate and distinct memory devices 1004 coupled to the PPU 1000. A partition unit 1080 will be described in more detail below in conjunction with FIG. 11B.

In an embodiment, a host processor executes a driver kernel that implements an application programming interface (API) that enables one or more applications executing on the host processor to schedule operations for execution on the PPU 1000. In an embodiment, multiple compute applications are simultaneously executed by the PPU 1000 and the PPU 1000 provides isolation, quality of service (QoS), and independent address spaces for the multiple compute applications. An application may generate instructions (e.g., API calls) that cause the driver kernel to generate one or more tasks for execution by the PPU 1000. The driver kernel outputs tasks to one or more streams being processed by the PPU 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory.

Threads, cooperating threads and a hierarchical grouping of threads such as cooperating thread arrays (CTA) and cooperating group arrays (CGA) according to some embodiments are described in more detail in U.S. application Ser. No. 17/691,621 filed Mar. 10, 2022, titled "Cooperative Group Arrays", the entire content of which is hereby incorporated by reference in its entirety.

Figure 11A:
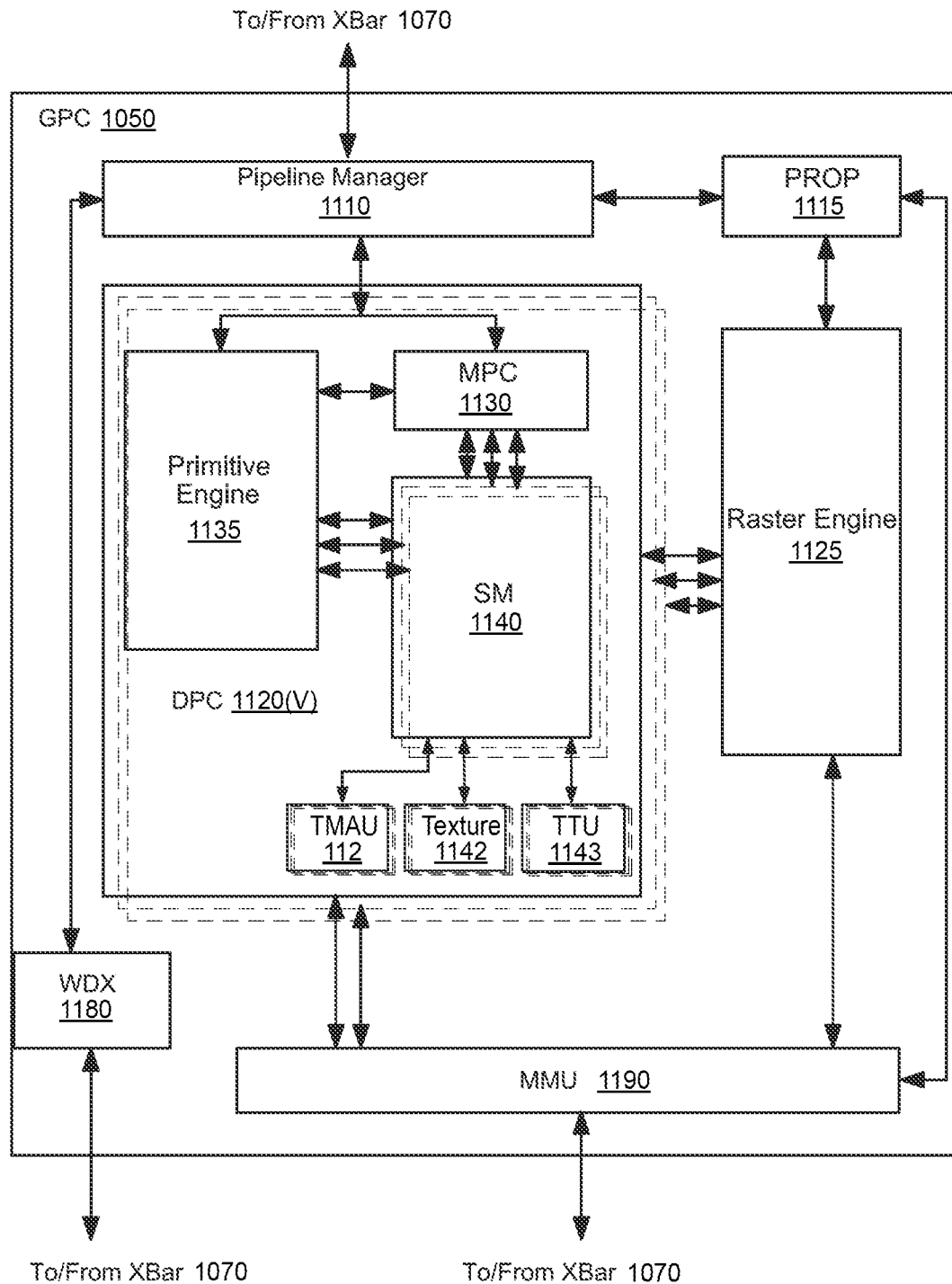
FIG. 11A illustrates an example general processing cluster (GPC) within the parallel processing unit of FIG. 10 with each streaming multiprocessor in the general processing cluster being coupled to a tensor memory access unit, according to some embodiments.

FIG. 11A illustrates a GPC 1050 of the PPU 1000 of FIG. 10, in accordance with an embodiment. As shown in FIG. 11A, each GPC 1050 includes a number of hardware units for processing tasks. In an embodiment, each GPC 1050 includes a pipeline manager 1110, a pre-raster operations unit (PROP) 1115, a raster engine 1125, a work distribution crossbar (WDX) 1180, a memory management unit (MMU) 1190, and one or more Data Processing Clusters (DPCs) 1120. It will be appreciated that the GPC 1050 of FIG. 11A may include other hardware units in lieu of or in addition to the units shown in FIG. 11A.

In an embodiment, the operation of the GPC 1050 is controlled by the pipeline manager 1110. The pipeline manager 1110 manages the configuration of the one or more DPCs 1120 for processing tasks allocated to the GPC 1050. In an embodiment, the pipeline manager 1110 may configure at least one of the one or more DPCs 1120 to implement at least a portion of a graphics rendering pipeline, a neural network, and/or a compute pipeline. For example, with respect to a graphics rendering pipeline, a DPC 1120 may be configured to execute a vertex shader program on the programmable streaming multiprocessor (SM) 1140. The pipeline manager 1110 may also be configured to route packets received from the work distribution unit 1025 to the appropriate logical units within the GPC 1050. For example, some packets may be routed to fixed function hardware units in the PROP 1115 and/or raster engine 1125 while other packets may be routed to the DPCs 1120 for processing by the primitive engine 1135 or the SM 1140.

Figure 11B:
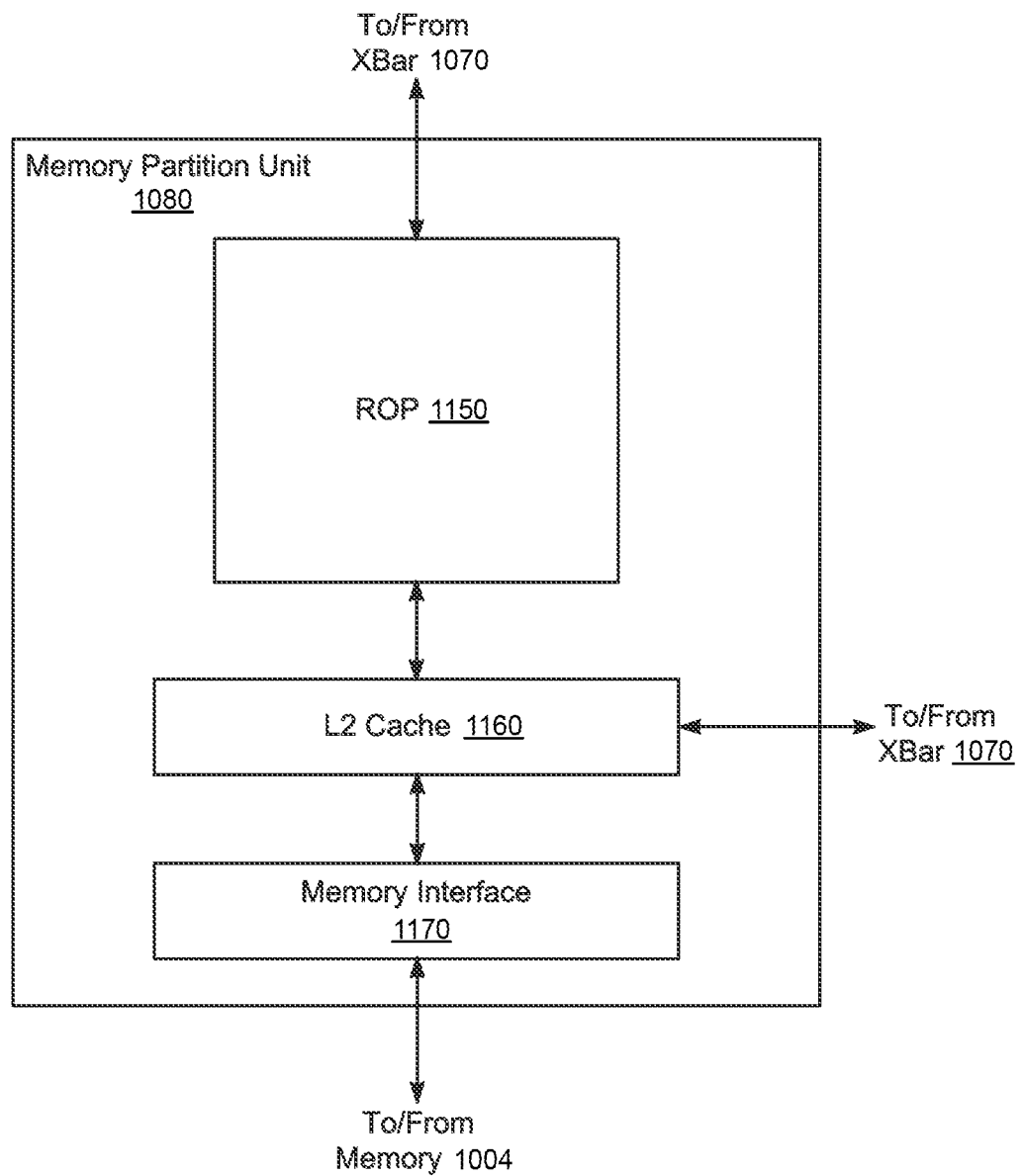
FIG. 11B illustrates an example memory partition unit of the parallel processing unit of FIG. 10.

The PROP unit 1115 is configured to route data generated by the raster engine 1125 and the DPCs 1120 to a Raster Operations (ROP) unit, described in more detail in conjunction with FIG. 11B. The PROP unit 1115 may also be configured to perform optimizations for color blending, organize pixel data, perform address translations, and the like.

Each DPC 1120 included in the GPC 1050 includes an M-Pipe Controller (MPC) 1130, a primitive engine 1135, and one or more SMs 1140. The MPC 1130 controls the operation of the DPC 1120, routing packets received from the pipeline manager 1110 to the appropriate units in the DPC 1120. For example, packets associated with a vertex may be routed to the primitive engine 1135, which is configured to fetch vertex attributes associated with the vertex from the memory 1004. In contrast, packets associated with a shader program may be transmitted to the SM 1140.

The SM 1140 comprises a programmable streaming processor that is configured to process tasks represented by a number of threads. Each SM 1140 is multi-threaded and configured to execute a plurality of threads (e.g., 32 threads) from a particular group of threads concurrently. In an embodiment, the SM 1140 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1140 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1140 is described in more detail below in conjunction with FIG. 12A.

The MMU 1190 provides an interface between the GPC 1050 and the partition unit 1080. The MMU 1190 may provide translation of virtual addresses into physical addresses, memory protection, and arbitration of memory requests. In an embodiment, the MMU 1190 provides one or more translation lookaside buffers (TLBs) for performing translation of virtual addresses into physical addresses in the memory 1004.

FIG. 11B illustrates a memory partition unit 1080 of the PPU 1000 of FIG. 10 in accordance with an embodiment. As shown in FIG. 11B, the memory partition unit 1080 includes a Raster Operations (ROP) unit 1150, a level two (L2) cache 1160, and a memory interface 1170. The memory interface 1170 is coupled to the memory 1004. Memory interface 1170 may implement 32, 64, 128, 1024-bit data buses, or the like, for high-speed data transfer. In an embodiment, the PPU 1000 incorporates U memory interfaces 1170, one memory interface 1170 per pair of partition units 1080, where each pair of partition units 1080 is connected to a corresponding memory device 1004. For example, PPU 1000 may be connected to up to Y memory devices 1004, such as high bandwidth memory stacks or graphics double-data-rate, version 5, synchronous dynamic random access memory, or other types of persistent storage.

In an embodiment, the memory interface 1170 implements an HBM2 memory interface and Y equals half U. In an embodiment, the HBM2 memory stacks are located on the same physical package as the PPU 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1004 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1000 process very large datasets and/or run applications for extended periods.

In an embodiment, the PPU 1000 implements a multi-level memory hierarchy. In an embodiment, the memory partition unit 1080 supports a unified memory to provide a single unified virtual address space for CPU and PPU 300 memory, enabling data sharing between virtual memory systems. In an embodiment the frequency of accesses by a PPU 1000 to memory located on other processors is traced to ensure that memory pages are moved to the physical memory of the PPU 1000 that is accessing the pages more frequently. In an embodiment, the NVLink 1010 supports address translation services allowing the PPU 1000 to directly access a CPU's page tables and providing full access to CPU memory by the PPU 1000.

In an embodiment, copy engines transfer data between multiple PPUs 1000 or between PPUs 1000 and CPUs. The copy engines can generate page faults for addresses that are not mapped into the page tables. The memory partition unit 1080 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1004 or other system memory may be fetched by the memory partition unit 1080 and stored in the L2 cache 1160, which is located on-chip and is shared between the various GPCs 1050. As shown, each memory partition unit 1080 includes a portion of the L2 cache 1160 associated with a corresponding memory device 1004. Lower level caches may then be implemented in various units within the GPCs 1050. For example, each of the SMs 1140 may implement a level one (L1) cache. The L1 cache is private memory that is dedicated to a particular SM 1140. Data from the L2 cache 1160 may be fetched and stored in each of the L1 caches for processing in the functional units of the SMs 1140. The L2 cache 1160 is coupled to the memory interface 1170 and the XBar 1070.

The ROP unit 1150 performs graphics raster operations related to pixel color, such as color compression, pixel blending, and the like. The ROP unit 450 also implements depth testing in conjunction with the raster engine 1125, receiving a depth for a sample location associated with a pixel fragment from the culling engine of the raster engine 1125. The depth is tested against a corresponding depth in a depth buffer for a sample location associated with the fragment. If the fragment passes the depth test for the sample location, then the ROP unit 1150 updates the depth buffer and transmits a result of the depth test to the raster engine 1125. It will be appreciated that the number of partition units 1080 may be different than the number of GPCs 1050 and, therefore, each ROP unit 1150 may be coupled to each of the GPCs 1050. The ROP unit 1150 tracks packets received from the different GPCs 1050 and determines which GPC 1050 that a result generated by the ROP unit 1150 is routed to through the Xbar 1070. Although the ROP unit 1150 is included within the memory partition unit 1080 in FIG. 11B, in other embodiment, the ROP unit 1150 may be outside of the memory partition unit 1080. For example, the ROP unit 1150 may reside in the GPC 1050 or another unit.

Figure 12:
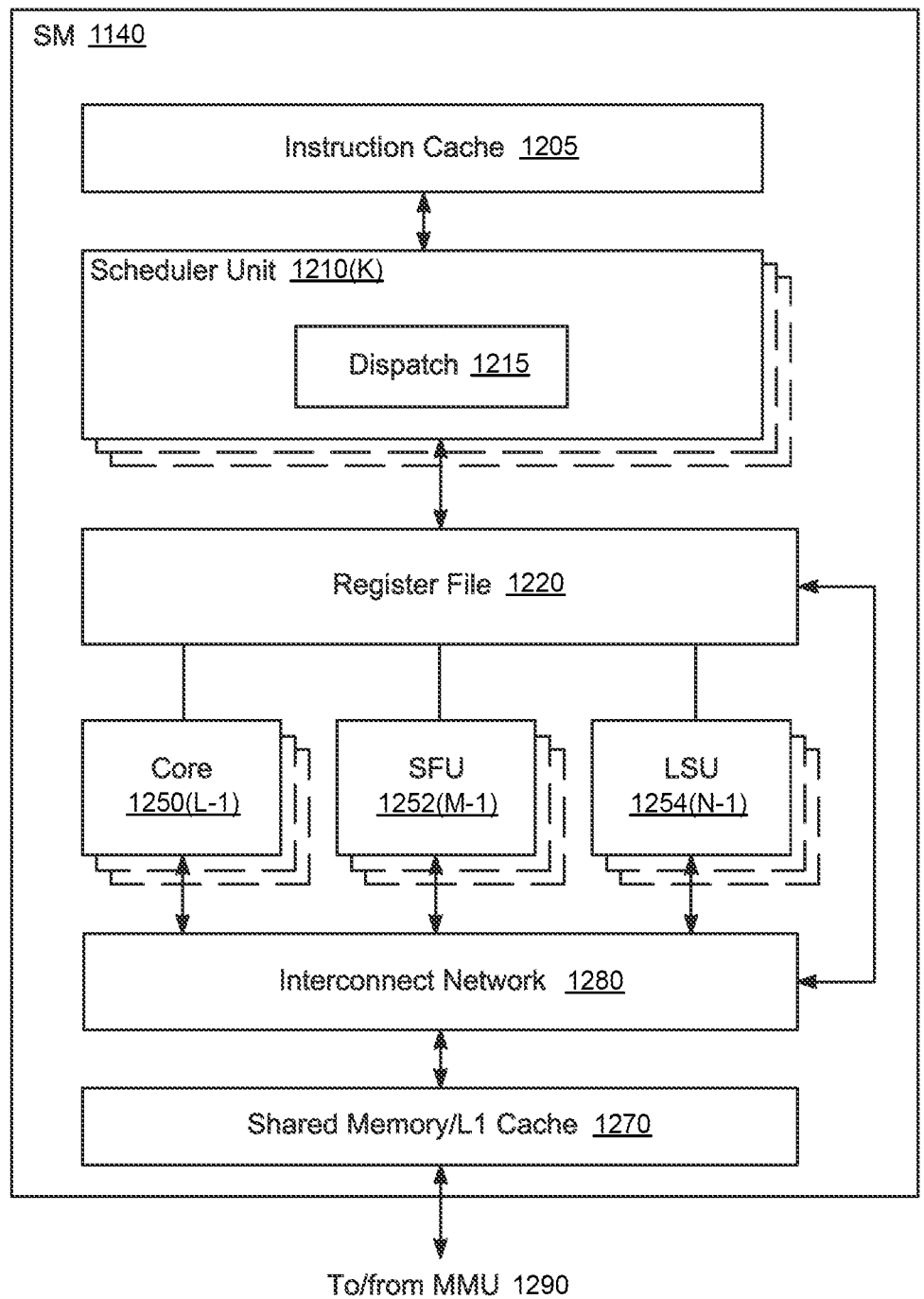
FIG. 12 illustrates an example streaming multiprocessor of FIG. 11A.

FIG. 12 illustrates the streaming multiprocessor 1140 of FIG. 11A, in accordance with an embodiment. As shown in FIG. 12, the SM 1140 includes an instruction cache 1205, one or more scheduler units 1210, a register file 1220, one or more processing cores 1250, one or more special function units (SFUs) 1252, one or more load/store units (LSUs) 1254, an interconnect network 1280, a shared memory/L1 cache 1270.

As described above, the work distribution unit 1025 dispatches tasks for execution on the GPCs 1050 of the PPU 1000. The tasks are allocated to a particular DPC 1120 within a GPC 1050 and, if the task is associated with a shader program, the task may be allocated to an SM 1140. The scheduler unit 1210 receives the tasks from the work distribution unit 1025 and manages instruction scheduling for one or more thread blocks assigned to the SM 1140. The scheduler unit 1210 schedules thread blocks for execution as warps of parallel threads, where each thread block is allocated at least one warp. In an embodiment, each warp executes 32 threads. The scheduler unit 1210 may manage a plurality of different thread blocks, allocating the warps to the different thread blocks and then dispatching instructions from the plurality of different cooperative groups to the various functional units (e.g., cores 1250, SFUs 1252, and LSUs 1254) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621 already incorporated by reference.

A dispatch unit 1215 is configured to transmit instructions to one or more of the functional units. In the embodiment, the scheduler unit 1210 includes two dispatch units 1215 that enable two different instructions from the same warp to be dispatched during each clock cycle. In alternative embodiments, each scheduler unit 1210 may include a single dispatch unit 1215 or additional dispatch units 1215.

Each SM 1140 includes a register file 1220 that provides a set of registers for the functional units of the SM 1140. In an embodiment, the register file 1220 is divided between each of the functional units such that each functional unit is allocated a dedicated portion of the register file 1220. In another embodiment, the register file 1220 is divided between the different warps being executed by the SM 1140. The register file 1220 provides temporary storage for operands connected to the data paths of the functional units.

Each SM 1140 comprises multiple processing cores 1250. In an embodiment, the SM 1140 includes a large number (e.g., 128, etc.) of distinct processing cores 1250.

Each core 1250 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1250 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1250. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 1250 or another functional unit (e.g., SFUs 1252 or LSUs 1254) and is configured to generate matrix data stored by diagonals and/or generate the original matrix and/or transposed matrix from the matrix data stored by diagonals. The transposition hardware may be provide inside of the shared memory 1270 to register file 1220 load path of the SM 1140.

In one example, the matrix data stored by diagonals may be fetched from DRAM and stored in the shared memory 1270. As the instruction to perform processing using the matrix data stored by diagonals is processed, transposition hardware disposed in the path of the shared memory 1270 and the register file 1220 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 1220.

Each SM 1140 also comprises multiple SFUs 1252 that perform special functions (e.g., attribute evaluation, reciprocal square root, and the like). In an embodiment, the SFUs 1252 may include a tree traversal unit (e.g., TTU 1143) configured to traverse a hierarchical tree data structure. In an embodiment, the SFUs 1252 may include texture unit (e.g., Texture Unit 1142) configured to perform texture map filtering operations. In an embodiment, the texture units are configured to load texture maps (e.g., a 2D array of texels) from the memory 1004 and sample the texture maps to produce sampled texture values for use in shader programs executed by the SM 1140. In an embodiment, the texture maps are stored in the shared memory/L1 cache 1170. The texture units implement texture operations such as filtering operations using mip-maps (e.g., texture maps of varying levels of detail). In an embodiment, each SM 1140 includes two texture units.

Each SM 1140 also comprises multiple LSUs 1254 that implement load and store operations between the shared memory/L1 cache 1270 and the register file 1220. Each SM 1140 includes an interconnect network 1280 that connects each of the functional units to the register file 1220 and the LSU 1254 to the register file 1220, shared memory/L1 cache 1270. In an embodiment, the interconnect network 1280 is a crossbar that can be configured to connect any of the functional units to any of the registers in the register file 1220 and connect the LSUs 1254 to the register file 1220 and memory locations in shared memory/L1 cache 1270. In example embodiments, the LSUs 1254 include a TMAU 112. However, in some embodiments, the TMAU 112 may be separate from the LSU. Each TMAU 112 may be closely coupled on a single SM or to more than one SM. In embodiments in which TMAU 112 is closely coupled to multiple SMs, an arbiter may receive requests from the SMs and forward them serially to the TMAU 112.

The shared memory/L1 cache 1270 is an array of on-chip memory that allows for data storage and communication between the SM 1140 and the primitive engine 1135 and between threads in the SM 1140. In an embodiment, the shared memory/L1 cache 1270 comprises 128 KB of storage capacity and is in the path from the SM 1140 to the partition unit 1080. The shared memory/L1 cache 1270 can be used to cache reads and writes. One or more of the shared memory/L1 cache 1270, L2 cache 1160, and memory 1004 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1270 enables the shared memory/L1 cache 1270 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 11A, are bypassed, creating a much simpler programming model. In the general purpose parallel computation configuration, the work distribution unit 1025 assigns and distributes blocks of threads directly to the DPCs 1120. The threads in a block execute the same program, using a unique thread ID in the calculation to ensure each thread generates unique results, using the SM 1140 to execute the program and perform calculations, shared memory/L1 cache 1270 to communicate between threads, and the LSU 1254 to read and write global memory through the shared memory/L1 cache 1270 and the memory partition unit 1080. When configured for general purpose parallel computation, the SM 1140 can also write commands that the scheduler unit 1020 can use to launch new work on the DPCs 1120.

The PPU 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1000 is embodied on a single semiconductor substrate. In another embodiment, the PPU 1000 is included in a system-on-a-chip (SoC) along with one or more other devices such as additional PPUs 1000, the memory 1004, a reduced instruction set computer (RISC) CPU, a memory management unit (MMU), a digital-to-analog converter (DAC), and the like.

In an embodiment, the PPU 1000 may be included on a graphics card that includes one or more memory devices 1004. The graphics card may be configured to interface with a PCIe slot on a motherboard of a desktop computer. In yet another embodiment, the PPU 1000 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13A:
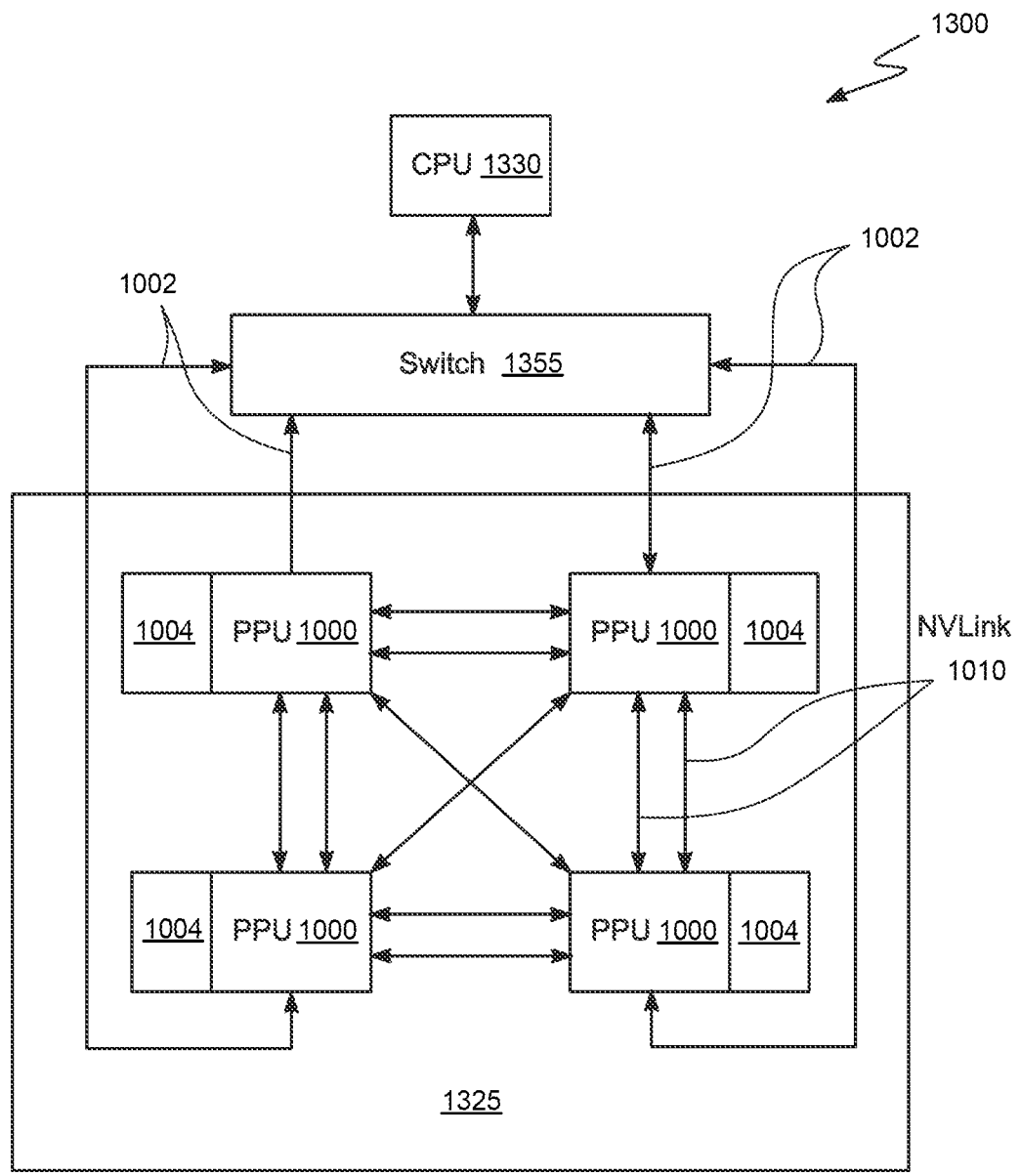
FIG. 13A is an example conceptual diagram of a processing system implemented using the parallel processing unit (PPU) of FIG. 10.

FIG. 13A is a conceptual diagram of a processing system 1300 implemented using the PPU 1000 of FIG. 10, in accordance with an embodiment. The exemplary system 1300 may be configured to implement the methods disclosed in this application (e.g., the TMAU in FIG. 1, 2, 6 or 11A). The processing system 1300 includes a CPU 1330, switch 1355, and multiple PPUs 1000 each and respective memories 1004. The NVLink 1010 provides high-speed communication links between each of the PPUs 1000. Although a particular number of NVLink 1010 and interconnect 1002 connections are illustrated in FIG. 13A, the number of connections to each PPU 1000 and the CPU 1330 may vary. The switch 1355 interfaces between the interconnect 1002 and the CPU 1330. The PPUs 1000, memories 1004, and NVLinks 1010 may be situated on a single semiconductor platform to form a parallel processing module 1325. In an embodiment, the switch 1355 supports two or more protocols to interface between various different connections and/or links.

In another embodiment (not shown), the NVLink 1010 provides one or more high-speed communication links between each of the PPUs 1000 and the CPU 1330 and the switch 1355 interfaces between the interconnect 1002 and each of the PPUs 1000. The PPUs 1000, memories 1004, and interconnect 1002 may be situated on a single semiconductor platform to form a parallel processing module 1325. In yet another embodiment (not shown), the interconnect 1002 provides one or more communication links between each of the PPUs 1000 and the CPU 1330 and the switch 1355 interfaces between each of the PPUs 1000 using the NVLink 1010 to provide one or more high-speed communication links between the PPUs 1000. In another embodiment (not shown), the NVLink 1010 provides one or more high-speed communication links between the PPUs 1000 and the CPU 1330 through the switch 1355. In yet another embodiment (not shown), the interconnect 1002 provides one or more communication links between each of the PPUs 1000 directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1325 may be implemented as a circuit board substrate and each of the PPUs 1000 and/or memories 1004 may be packaged devices. In an embodiment, the CPU 1330, switch 1355, and the parallel processing module 1325 are situated on a single semiconductor platform.

In an embodiment, the signaling rate of each NVLink 1010 is 20 to 25 Gigabits/second and each PPU 1000 includes six NVLink 1010 interfaces (as shown in FIG. 13A, five NVLink 1010 interfaces are included for each PPU 1000). Each NVLink 1010 provides a data transfer rate of 25 Gigabytes/second in each direction, with six links providing 1000 Gigabytes/second. The NVLinks 1010 can be used exclusively for PPU-to-PPU communication as shown in FIG. 13A, or some combination of PPU-to-PPU and PPU-to-CPU, when the CPU 1330 also includes one or more NVLink 1010 interfaces.

In an embodiment, the NVLink 1010 allows direct load/store/atomic access from the CPU 1330 to each PPU's 1000 memory 1004. In an embodiment, the NVLink 1010 supports coherency operations, allowing data read from the memories 1004 to be stored in the cache hierarchy of the CPU 1330, reducing cache access latency for the CPU 1330. In an embodiment, the NVLink 1010 includes support for Address Translation Services (ATS), allowing the PPU 1000 to directly access page tables within the CPU 1330. One or more of the NVLinks 1010 may also be configured to operate in a low-power mode.

Figure 13B:
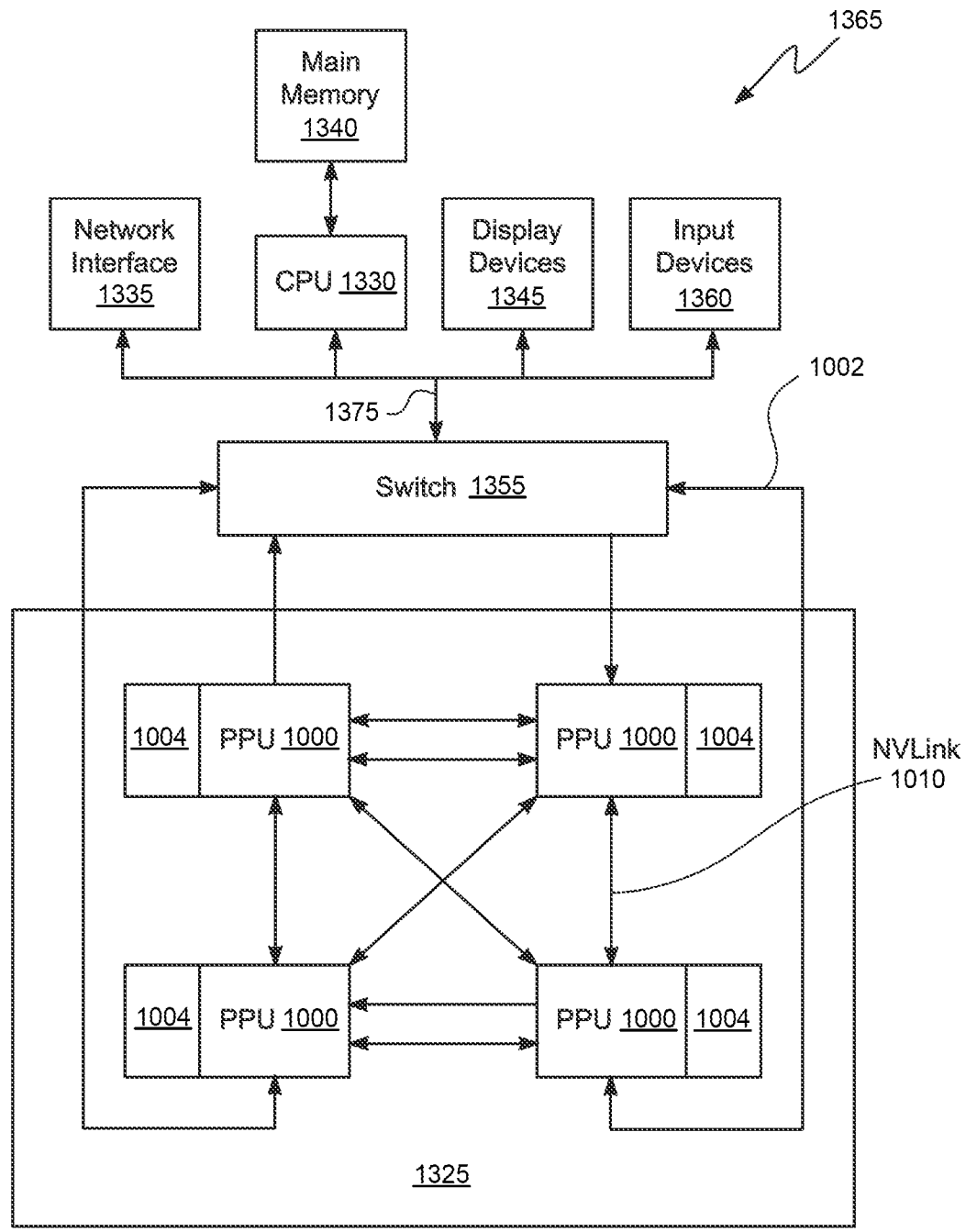
FIG. 13B is a block diagram of an exemplary system in which the various architecture and/or functionality of the various previous embodiments may be implemented.

FIG. 13B illustrates an exemplary system 1365 in which the various architecture and/or functionality of the various previous embodiments may be implemented. The exemplary system 1365 may be configured to implement the methods disclosed in this application (e.g., the TMAU in FIG. 1, 2, 6 or 11A).

As shown, a system 1365 is provided including at least one central processing unit 1330 that is connected to a communication bus 1375. The communication bus 1375 may be implemented using any suitable protocol, such as PCI (Peripheral Component Interconnect), PCI-Express, AGP (Accelerated Graphics Port), HyperTransport, or any other bus or point-to-point communication protocol(s). The system 1365 also includes a main memory 1340. Control logic (software) and data are stored in the main memory 1340 which may take the form of random access memory (RAM).

The system 1365 also includes input devices 1360, the parallel processing system 1325, and display devices 1345, e.g. a conventional CRT (cathode ray tube), LCD (liquid crystal display), LED (light emitting diode), plasma display or the like. User input may be received from the input devices 1360, e.g., keyboard, mouse, touchpad, microphone, and the like. Each of the foregoing modules and/or devices may even be situated on a single semiconductor platform to form the system 1365. Alternately, the various modules may also be situated separately or in various combinations of semiconductor platforms per the desires of the user.

Further, the system 1365 may be coupled to a network (e.g., a telecommunications network, local area network (LAN), wireless network, wide area network (WAN) such as the Internet, peer-to-peer network, cable network, or the like) through a network interface 1335 for communication purposes.

The system 1365 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1340 and/or the secondary storage. Such computer programs, when executed, enable the system 1365 to perform various functions. The memory 1340, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1365 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 1000. The API provides an abstraction for a programmer that lets a programmer utilize specialized graphics hardware, such as the PPU 1000, to generate the graphical data without requiring the programmer to utilize the specific instruction set for the PPU 1000. The application may include an API call that is routed to the device driver for the PPU 1000. The device driver interprets the API call and performs various operations to respond to the API call. In some instances, the device driver may perform operations by executing instructions on the CPU. In other instances, the device driver may perform operations, at least in part, by launching operations on the PPU 1000 utilizing an input/output interface between the CPU and the PPU 1000. In an embodiment, the device driver is configured to implement the graphics processing pipeline 1400 utilizing the hardware of the PPU 1000.

Various programs may be executed within the PPU 1000 in order to implement the various stages of the processing for the application program. For example, the device driver may launch a kernel on the PPU 1000 to perform one stage of processing on one SM 1140 (or multiple SMs 1140). The device driver (or the initial kernel executed by the PPU 1000) may also launch other kernels on the PPU 1000 to perform other stages of the processing. If the application program processing includes a graphics processing pipeline, then some of the stages of the graphics processing pipeline may be implemented on fixed unit hardware such as a rasterizer or a data assembler implemented within the PPU 1000. It will be appreciated that results from one kernel may be processed by one or more intervening fixed function hardware units before being processed by a subsequent kernel on an SM 1140.

All patents and printed publications referred to above are incorporated by reference herein as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A parallel processor comprising:
an interface to an external memory;
a plurality of multicore processors, each multicore processor having a respectively different shared memory; and
a plurality of memory access hardware circuits, each memory access hardware circuit being coupled to a multicore processor of the plurality of multicore processors and being configured to:
receive, from the coupled multicore processor, a memory access request for a block of data; and
in response to the memory access request, access the block of data at a source memory location in the respectively different shared memory of the coupled multicore processor or the external memory, and asynchronously transfer the block of data from the source memory location to a destination memory location in the respectively different shared memory of the coupled multicore processor or the external memory;
wherein the asynchronous transfer is from a location in the external memory to another location in the external memory, or from a location in the respectively different shared memory of the coupled multicore processor.

2. A method performed in a parallel processing unit comprising a plurality of multiprocessors, the method comprising:
receiving by a memory access hardware circuit coupled to a multicore processor of the plurality of multicore processors, from the coupled multicore processor, a memory access request for a block of data, wherein each multicore processor includes a respectively different shared memory, wherein the memory access hardware circuit is one of a plurality of memory access circuitry each coupled to one of the multicore processors; and in response to the memory access request, accessing the block of data at a source memory location in the respectively different shared memory of the coupled multicore processor or the external memory, and asynchronously transferring by the memory access hardware circuit, the block of data from the source memory location to a destination memory location in the respectively different shared memory of the coupled multicore processor and an external memory, wherein the asynchronous transfer is from a location in the external memory to another location in the external memory, or from a location in the respectively different shared memory of the coupled multicore processor to another location in the respectively different shared memory of the coupled multicore processor.

3. A method performed in a parallel processing unit comprising a plurality of multiprocessors, the method comprising:

receiving by a memory access hardware circuit coupled to a multicore processor of the plurality of multicore processors, from the coupled multicore processor, a memory access request for a block of data, wherein each multicore processor includes a respectively different non-cached shared memory, wherein the memory access hardware circuit is one of a plurality of memory access circuitry each coupled to one of the multicore processors; and in response to the memory access request, accessing the block of data at a source memory location in the respectively different non-cached shared memory of the coupled multicore processor or the external memory, and asynchronously transferring by the memory access hardware circuit, the block of data from the source memory location to a destination memory location in the respectively different non-cached shared memory of the coupled multicore processor and an external memory, wherein the asynchronous transfer is from a location in the external memory to another location in the external memory, or the asynchronous transfer is from a location in the respectively different shared memory of the coupled multicore processor to another location in the respectively different shared memory of the coupled multicore processor.

4. A memory access hardware circuit comprising:
an interface to an external memory;
a memory input/output interface to receive memory access requests from a multicore processor;
at least one memory interface to a respectively different shared memory at each of one or more other multicore processors and the multicore processor, wherein the respectively different shared memory is a non-cached shared memory; and
a processing pipeline configured to:
  receive, from the multicore processor, a memory access request for a block of data; and
  in response to the memory access request, access the block of data at a source memory location in the respectively different shared memory of the coupled multicore processor or the external memory, and asynchronously transfer the block of data from the source memory location to a destination memory location in the respectively different shared memory of the coupled multicore processor and the external memory, wherein
  the asynchronous transfer is from a location in the external memory to another location in the external memory, or
  the asynchronous transfer is from a location in the respectively different shared memory of the coupled multicore processor to another location in the respectively different shared memory of the coupled multicore processor.

5. A parallel processor comprising:
an interface to an external memory;
a plurality of multicore processors, each multicore processor having a respectively different shared memory, wherein the respectively different shared memory is a non-cached shared memory; and
a plurality of memory access hardware circuits, each memory access hardware circuit being coupled to a multicore processor of the plurality of multicore processors and being configured to:
  receive, from the coupled multicore processor, a memory access request for a block of data; and
  in response to the memory access request, access the block of data at a source memory location in the respectively different shared memory of the coupled multicore processor or the external memory, and asynchronously transfer the block of data from the source memory location to a destination memory location in the respectively different shared memory of the coupled multicore processor or the external memory, wherein
  the asynchronous transfer is from a location in the external memory to another location in the external memory, or
  the asynchronous transfer is from a location in the respectively different shared memory of the coupled multicore processor to another location in the respectively different shared memory of the coupled multicore processor.

6. The parallel processor according to claim 5, wherein the asynchronous transfer is from a location in the external memory to another location in the external memory.

7. The parallel processor according to claim 5, wherein the asynchronous transfer is from a location in the respectively different shared memory of the coupled multicore processor to another location in the respectively different shared memory of the coupled multicore processor.

8. The parallel processor according to claim 5, wherein the memory access hardware circuit coupled to the multicore processor is configured to read and write to the respectively different shared memory of the multicore processor coupled to the memory access hardware circuit and to the external memory.

9. The parallel processor according to claim 5, wherein the memory access hardware circuit coupled to the multicore processor is configured to copy the data block from the external memory to the respectively different shared memory of the coupled multicore processor.

10. The parallel processor according to claim 5, wherein the asynchronous transfer is from a location in the respectively different shared memory of the coupled multicore processor to another location in the respectively different shared memory of the coupled multicore processor, and the memory access hardware circuit coupled to the multicore processor is further configured to perform said asynchronous transfer by directly writing the block of data from a first location in the respectively different shared memory to a second location in the respectively different shared memory wherein the first and second locations in the respectively different shared memory are accessible by respectively different multicore processors of the plurality of multicore processors, or wherein the asynchronous transfer is from a location in the external memory to another location in the external memory and the memory access hardware circuit coupled to the multicore processor is further configured to perform said asynchronous transfer by directly writing the block of data from a first location in the external memory to a second location in the external memory.

11. The parallel processor according to claim 5, wherein the memory access hardware circuit coupled to the multicore processor is further configured to perform said asynchronous transfer, irrespective of the size of the block of data, in response to said memory access request received in a single message.

12. The parallel processor according to claim 5, wherein the memory access hardware circuit coupled to the multicore processor is further configured to, for each sub-block of data in the data block, update a counter in the respectively different shared memory, wherein the multiprocessor comprises synchronization circuitry configured to monitor the counter for a predetermined value.

13. The parallel processor according to claim 5, wherein the memory access hardware circuit coupled to the multicore processor is further configured to read the block of data in the external memory and write the block of data to a location in the respectively different shared memory for each of a group of the plurality of multiprocessors.

14. The parallel processor according to claim 5, wherein the memory access hardware circuit coupled to the multicore processor comprises a request queue, a request generation circuitry, and a request completion tracking circuitry.

15. The parallel processor according to claim 14, wherein the request queue is configured to accept memory access requests for tensors and memory access requests for non-tensor data blocks.

16. The parallel processor according to claim 5, wherein each said multicore processor comprises plural parallel processing cores having different computing capabilities and/or precisions, the plural parallel processing cores accessing a common instruction cache memory.

* * * * *